US012057102B2

(12) United States Patent
Shen et al.

(10) Patent No.: US 12,057,102 B2
(45) Date of Patent: Aug. 6, 2024

(54) LANGUAGE IDENTIFYING DEVICE AND COMPUTER PROGRAM FOR SAME, AND SPEECH PROCESSING DEVICE

(71) Applicant: National Institute of Information and Communications Technology, Tokyo (JP)

(72) Inventors: Peng Shen, Tokyo (JP); Komei Sugiura, Tokyo (JP); Hisashi Kawai, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 336 days.

(21) Appl. No.: 17/593,822

(22) PCT Filed: Mar. 12, 2020

(86) PCT No.: PCT/JP2020/010830
§ 371 (c)(1),
(2) Date: Sep. 24, 2021

(87) PCT Pub. No.: WO2020/195897
PCT Pub. Date: Oct. 1, 2020

(65) Prior Publication Data
US 2022/0189457 A1 Jun. 16, 2022

(30) Foreign Application Priority Data
Mar. 28, 2019 (JP) .................................. 2019-062346

(51) Int. Cl.
*G10L 15/16* (2006.01)
*G06N 3/08* (2023.01)
(Continued)

(52) U.S. Cl.
CPC .............. *G10L 15/005* (2013.01); *G06N 3/08* (2013.01); *G10L 15/02* (2013.01); *G10L 15/16* (2013.01); *G10L 15/22* (2013.01)

(58) Field of Classification Search
CPC ....... G10L 15/02; G10L 15/005; G10L 15/22; G10L 15/16; G10L 15/28; G10L 13/00;
(Continued)

(56) References Cited

U.S. PATENT DOCUMENTS 9,275,635 B1 * 3/2016 Beaufays ................ G10L 15/32
9,514,747 B1 12/2016 Bisani et al.
(Continued)

FOREIGN PATENT DOCUMENTS

JP    H09-127981 A    5/1997
JP    2003-005784 A   1/2003
(Continued)

OTHER PUBLICATIONS

International Search Report for corresponding Application No. PCT/JP2020/010830, mailed Jun. 23, 2020.

*Primary Examiner* — Md S Elahee
(74) *Attorney, Agent, or Firm* — Renner, Otto, Boisselle & Sklar, LLP

(57) ABSTRACT

A language identifying device includes: a neural network responsive to an input of a speech signal, for outputting a score for each of a plurality of languages indicating that the speech represented by the speech signal is the speech of the corresponding language; a selecting device for selecting, among the scores output by the neural network, scores of a smaller number of languages; a normalizing device for normalizing the scores selected by the selecting device; a determining device for determining whether the maximum of the normalized scores normalized by the normalizing device is equal to or higher than a threshold; and a language
(Continued)

deciding device, responsive to a positive determination by the determining device, for selectively performing a process of deciding the language corresponding to the maximum of the scores as the language of the speech represented by the speech signal, or a process of discarding outputs of the score selecting device.

10 Claims, 15 Drawing Sheets

(51) Int. Cl.
*G10L 15/00* (2013.01)
*G10L 15/02* (2006.01)
*G10L 15/22* (2006.01)

(58) Field of Classification Search
CPC ..... G10L 15/32; G10L 15/193; G06F 40/263; G06F 40/58
USPC .......................................................... 704/232
See application file for complete search history.

(56) References Cited

U.S. PATENT DOCUMENTS

| | | |
|---|---|---|
| 2016/0035344 A1 | 2/2016 | Gonzalez-Dominguez et al. |
| 2018/0315420 A1* | 11/2018 | Ash ........................ G10L 15/193 |
| 2018/0336883 A1 | 11/2018 | Li et al. |
| 2023/0115420 A1* | 4/2023 | Dabas ..................... G06F 3/167 704/235 |

FOREIGN PATENT DOCUMENTS

| | | | |
|---|---|---|---|
| JP | 2006-030874 A | | 2/2006 |
| JP | 2009129280 A | * | 6/2009 |
| JP | 2012-103554 A | | 5/2012 |
| JP | 2018-087935 A | | 6/2018 |
| JP | 2019-023690 A | | 2/2019 |

* cited by examiner

LANGUAGE IDENTIFYING DEVICE AND COMPUTER PROGRAM FOR SAME, AND SPEECH PROCESSING DEVICE

TECHNICAL FIELD

The present invention relates to a device for processing multi-lingual speeches and, more specifically, to a language identifying device for identifying what language is input as a speech signal as well as to a speech processing device incorporating the language identifying device. The present application claims convention priority based on Japanese Patent Application No. 2019-062346 filed on Mar. 28, 2019, the entire contents of which is incorporated herein by reference.

BACKGROUND ART

Recently, more and more people are using devices that recognize, automatically translate, and synthesize speeches in multiple languages for assisting speakers of different languages to enjoy conversation. The number of available languages is increasing and it is expected that such a device enables communication among people speaking diverse languages.

In order to realize such multi-lingual speech recognition with high accuracy, it is necessary to find the language the speech signal represents. For this purpose, typically, a language to be used is designated before activating speech recognition.

In reality, however, two speakers of different languages trying to communicate using one multi-lingual speech processing device will have a difficulty in determining the language to be used, if they do not know which language the counterpart speaks. The owner of the device may not have any problem since the device is basically set to his/her native language (for example, Japanese); however, if the counterpart does not at all understand Japanese, it is not easy to select the language the counterpart would speak. On the one hand, the displays and indications on the device are basically in Japanese and, therefore, the counterpart speaker cannot get the idea how to operate the device. On the other hand, while the owner of the device knows how to operate it, he/she cannot configure the device because the language of the counterpart is unknown.

As described above, beginning a smooth dialogue with a multi-lingual speech processing device is rather difficult.

Patent Literature 1 below proposes a solution to this problem. According to the technique of Patent Literature 1, an input speech signal is subjected to speech recognition in multiple languages. As a result of the speech recognition, a confidence measure is output for each of the languages. According to the technique of Patent Literature 1, the language that has the highest confidence measure of the speech recognition is selected as the language of the speech represented by the speech signal.

CITATION LIST

Patent Literature

PTL 1: JP2019-23690A

SUMMARY OF INVENTION

Technical Problem

The technique described in Patent Literature 1, however, requires large amount of calculation, and successive processing takes time, because speech recognition in each of the multiple languages is done. When the processes are done in parallel, considerable computational resources are consumed. For example, when a plurality of requests is to be processed on a server, cumulative requests lead to excessive server load resulting in a delay in speech recognition.

Therefore, language identification by a conventional multi-lingual speech processing device has a problem that it takes a long time before starting actual speech processing. When, for example, a foreign traveler asks you about something, it is desirable to start speech processing for the dialogue quickly and to respond as soon as possible.

Therefore, an object of the present invention is to provide a language identifying device and a speech recognition device providing results of speech processing quickly even when the language represented by a speech signal is unknown.

Solution to Problem

According to a first aspect, the present invention provides a language identifying device for identifying a language represented by an input speech signal as one of a first plurality of languages including: a score output means responsive to an input of a speech signal, for outputting, for each of the first plurality of languages, a score indicating that the speech represented by the speech signal is the speech in that language; a selecting means for selecting, from the scores output from the score output means, scores of a second plurality of languages smaller than the first plurality, designated beforehand from the first plurality of languages; a normalizing means for normalizing each of the scores selected by the selecting means on the basis of the sum of scores of the second plurality of languages; a determining means for determining whether the maximum of the normalized scores normalized by the normalizing means is equal to or larger than a threshold; and a language deciding means, responsive to the determination by the determining means, for selectively performing either one of a process of deciding the language corresponding to the maximum of the score as the language of the speech represented by the speech signal and a process of discarding the output of the score selecting means.

Preferably, the score output means includes a neural network trained in advance to output, in response to a time series of acoustic features calculated from the speech signal, scores of languages of the speech represented by the speech signal.

More preferably, each of the scores output from the neural network is normalized with respect to the sum of the scores.

According to a second aspect, the present invention provides a computer program causing a computer to function as each means of any of the devices described above.

According to a third aspect, the present invention provides a speech processing device, including: a language name storage means for storing language name of a default language to be an object of speech processing; a speech processing means capable of performing at least speech recognition of each of a plurality of languages, for receiving designation of a language name and for processing a given speech signal as a speech of the designated language; a language identifying means, responsive to an input of the speech signal, for identifying a language represented by the speech signal as one of said plurality of languages; a first speech processing activating means, responsive to the input of the speech signal, for designating the default language stored in the language name storage means, and for activating processing of the speech signal by the speech processing means; a match determining means for determining whether the language identified by the language identifying means matches the default language or not; and a second speech processing activating means, responsive to a negative determination by the match determining means, for ending processing of the speech signal by the speech processing means, and for activating, from a prescribed position of the speech signal, processing of the speech signal by the speech processing means by designating the language identified by the language identifying means.

Preferably, the speech processing device further includes a default language determining means for determining, based on the result of determination by the match determining means and on the default language stored in the language name storage means, which of the plurality of languages is to be determined to be the language name of the default language stored in the language name storage means by a predetermined algorithm, and having it stored in the language name storage means.

DESCRIPTION OF EMBODIMENTS

Figure 1:
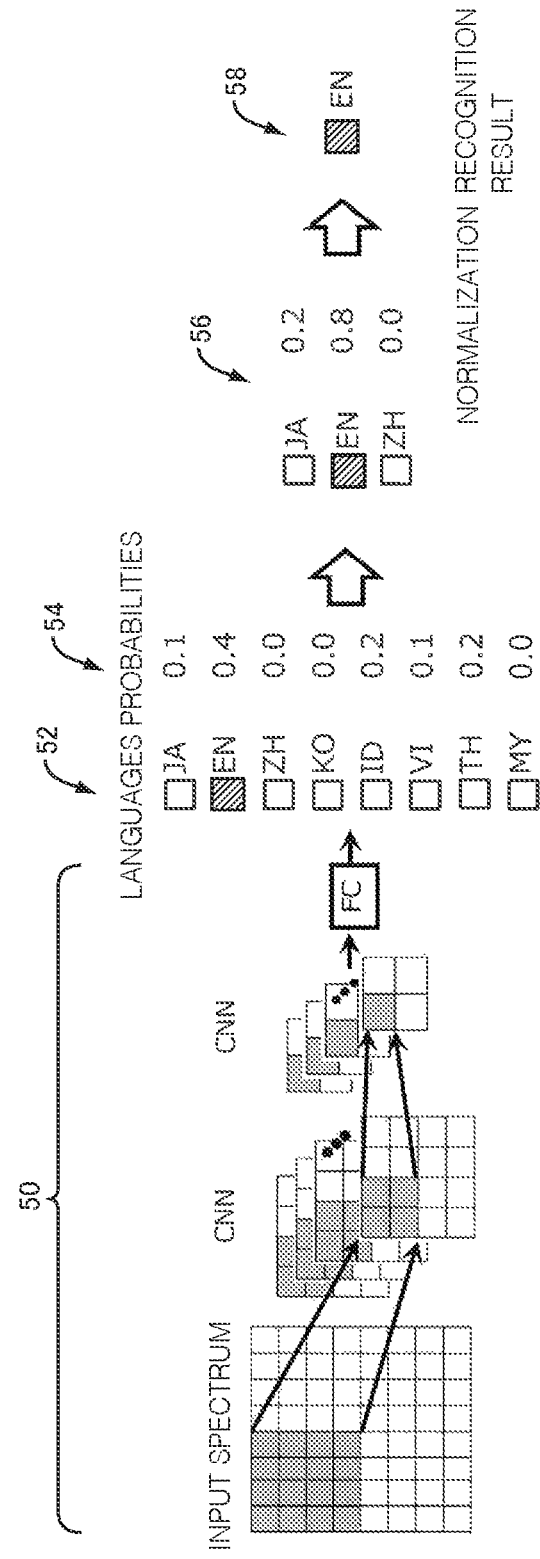
FIG. 1 is schematic illustration showing an outline of language identification in accordance with a first embodiment of the present invention.

In the following description and in the drawings, the same components are denoted by the same reference characters. Therefore, detailed description thereof will not be repeated.

First Embodiment

<Configuration>

FIG. 1 is a schematic illustration showing an outline of language identification in accordance with a first embodiment of the present invention. Referring to FIG. 1, in the present embodiment, by processing input speech signals by a neural network 50, probabilities 54 that the input speech signals belong to each of predetermined eight different languages 52 are calculated. The probabilities 54 are normalized to be summed up to 1. Further, probabilities of a plurality of (in the following embodiment, three) selected languages 56, which are designated beforehand by a user from the eight different languages 52, are extracted and these probabilities are further normalized to be summed up to 1. Of the selected languages 56, the language 58 that has the highest of the normalized probabilities is presumed to be the language of the input speech. Here, if the probability after normalization is equal to or higher than a predetermine threshold, the language 58 is adopted as the presumed result and if not, the presumed result is discarded. If the presumed result is discarded, the process of guessing language is restarted, using the continuing part of the speech.

Figure 2:
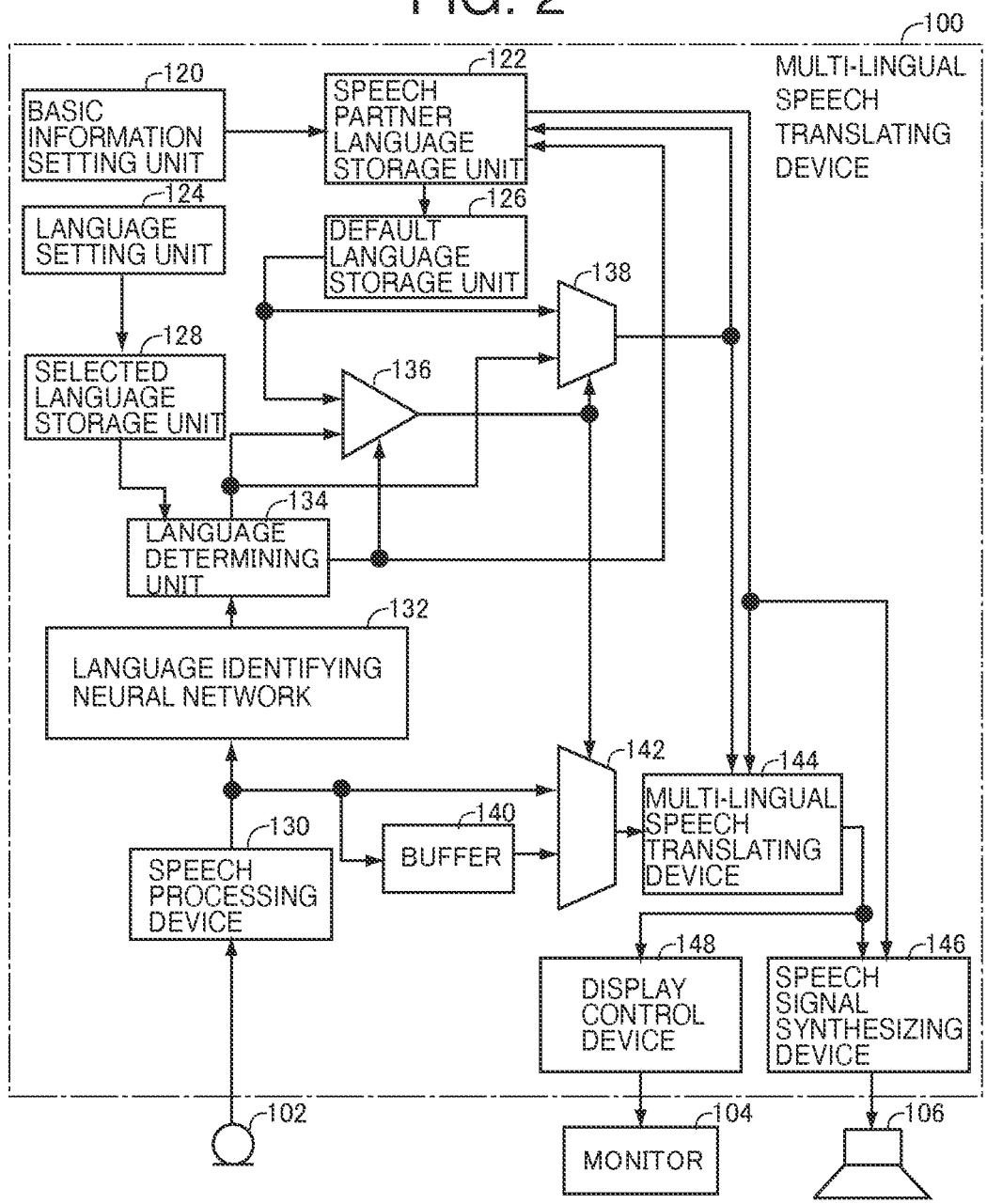
FIG. 2 is a block diagram schematically showing a configuration of a speech processing device in accordance with the first embodiment of the present invention.

FIG. 2 is a block diagram schematically showing a configuration of a multi-lingual speech processing device 100 that automatically recognizes which language is represented by input speech signals and that conducts, based on the result of recognition, speech processing of the speech signals. In the present embodiment, multi-lingual speech processing device 100 guesses which of the eight different languages is represented by the speech, recognizes the speech, automatically translates, and synthesizes and outputs speech of the translated result.

Referring to FIG. 2, multi-lingual speech processing device 100 has a microphone (hereinafter referred to as "microphone") 102, a monitor 104 and a speaker 106 connected thereto. Multi-lingual speech processing device 100 includes: a speech processing device 130 for receiving a speech signal from microphone 102, digitizing and framing the same and thereby converting the speech signal to a time series of speech data vectors representing each voice; a language identifying neural network 132 for receiving a prescribed length of speech data vector sequence output from the speech processing device 130 as an input and for outputting probabilities for respective ones of the aforementioned eight different languages that the language is represented by the input speech signal; and a language determining unit 134 for determining the language of the input speech, based on the eight probabilities output from the language identifying neural network 132.

In the present embodiment, as shown in FIG. 1, the languages as the objects of determination are Japanese (abbreviated as (JA): in the following, letters in the parentheses represent abbreviations of respective languages), English (EN), Chinese (ZH), Korean (KO), Indonesian (ID), Vietnamese (VI), Thai (TH) and Myanmar (MY).

Multi-lingual speech processing device 100 further includes; a basic information setting unit 120 for setting, through an interactive process, basic information including a language used for the user interface when multi-lingual speech processing device 100 is used; a speech partner language storage unit 122 for storing information related to the language of the other person or partner of the speaker whose utterance is being processed; a language setting unit 124 for setting, through interactive process, information related to the eight different languages that are the objects of processing of language identifying neural network 132, related to three languages selected by the user, and among these, the language designated beforehand by the user as the language of the first input; a selected language storage unit 128 for storing information set by language setting unit 124, and a default language storage unit 126 for storing, as a default value, the language presumed to be the language of the next speech. The values stored in default language storage unit 126 and speech partner language storage unit 122 are updated by a prescribed algorithm as the identified language changes along with the operation of multi-lingual speech processing device 100.

The language that is stored in default language storage unit 126 is the one tentatively inferred by the user when the language of speech partner is unknown, or the one set by the user beforehand as the default language of any speech partner. If the language of speech partner is clearly known, the language may be simply set in default language storage unit 126 using language setting unit 124. In that case, however, the determination of language by language identifying neural network 132 is unnecessary in the first place. In the present embodiment, configurations and operations of such a case will not be discussed. We assume only the situation where the language of speech partner is unknown.

Multi-lingual speech processing device 100 further includes: a change-of-language determining unit 136 for determining whether or not the language determined by language determining unit 134 of the input speech signal is changed from the default language stored in default language storage unit 126, and for outputting a signal indicating the determination result; a language selecting unit 138 having two inputs connected to outputs of the default language storage unit 126 and of the language determining unit 134, respectively, for selecting either one in accordance with the output of the change-of-language determining unit 136.

The multi-lingual speech processing device 100 further includes: an FIFO buffer 140 for storing a prescribed length of time of speech data vector sequence output from speech processing device 130; a speech data selecting unit 142 having two inputs connected to an output of speech processing device 130 and an output of buffer 140, respectively, and selectively outputs either one in accordance with an output of the change-of-language determining unit 136; and a multi-lingual speech translating device 144 having an input connected to an output of the speech data selecting unit 142 and, assuming that the language represented by the input speech data vector sequence is the speech designated by the output of language selecting unit 138, performing speech translation. The buffer 140 is necessary when speech translation of speech data starts in the default language and then the language actually used is found to be different from the default language, to restart, from the outset, the speech translation of the speech data in the right language, as will be described later.

In the present embodiment, multi-lingual speech translating device 144 executes speech recognition process on the input speech data vector sequence, automatically translates the result to the language stored in speech partner language storage unit 122, and further, outputs text of the result of automatic translation and parameters for speech synthesis.

Multi-lingual speech processing device 100 further includes: a speech signal synthesizing device 146 for synthesizing a speech signal based on the parameters for speech synthesis output from the multi-lingual speech translating device 144 and on the information stored in the speech partner language storage unit 122, and inputting it to speaker 106 to generate a speech; and a display control device 148 for controlling the monitor 104 based on the text information output from the multi-lingual speech translating device 144 to display the text.

Figure 3:
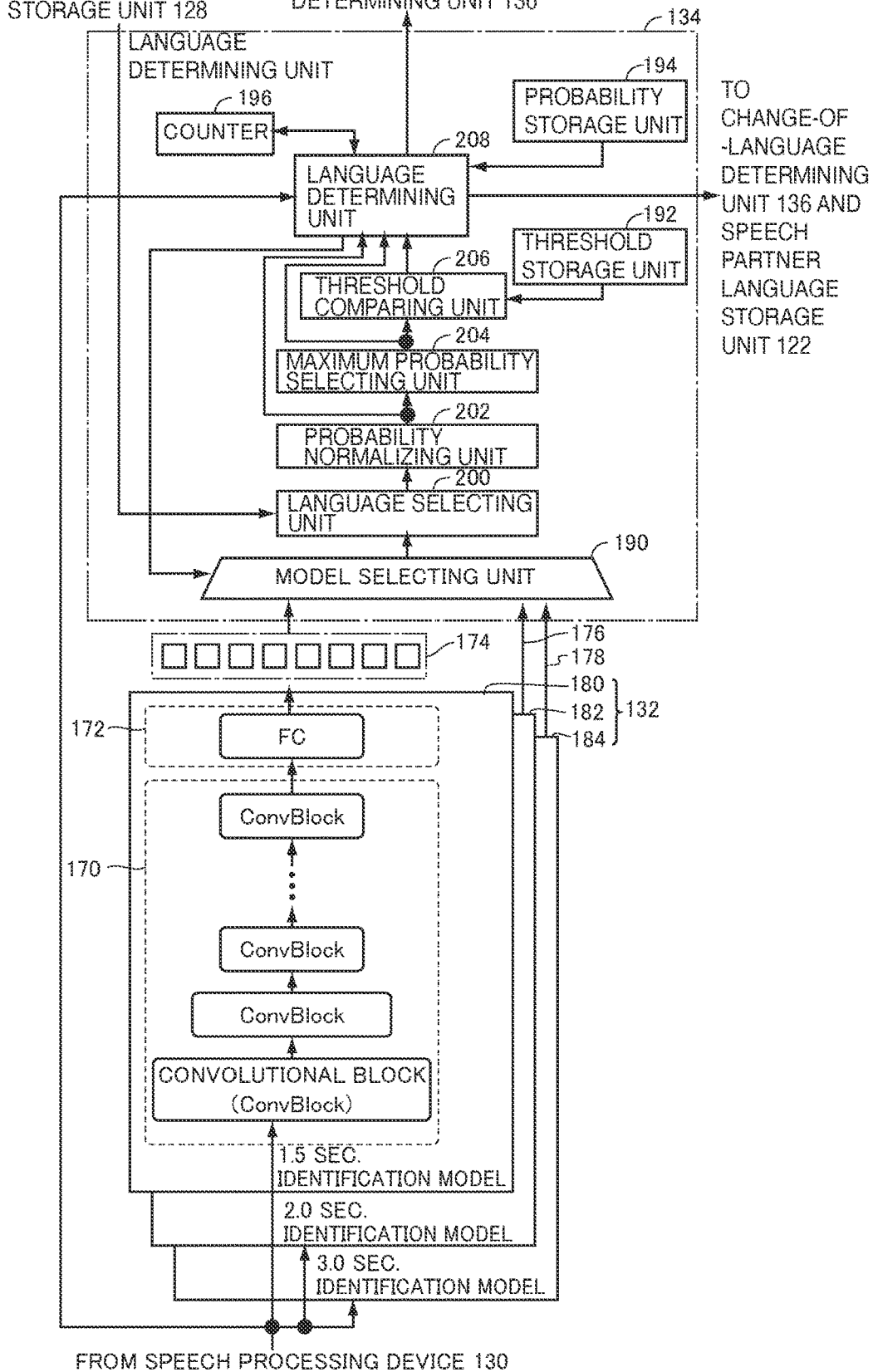
FIG. 3 is a block diagram showing a central configuration of language identification in accordance with the first embodiment of the present invention.

FIG. 3 is a block diagram showing a main configuration of the language identification in accordance with the first embodiment of the present invention. Referring to FIG. 3, the language identifying neural network 132 includes three language identifying models 180, 182 and 184. These models are all neural networks. The language identifying model 180 receives speech data of 1.5 seconds as inputs and estimates the language represented by the speech. Similarly, language identifying model 182 receives speech data of 2.0 seconds, and language identifying model 184 receives speech data of 3.0 seconds as inputs.

By way of example, language identifying model 180 includes a group of convolution layers 170 including a plurality of convolution blocks, and a fully connected layer 172 receiving an output from the group of convolution layers 170 and outputting probabilities 174 of eight different languages. Fully connected layer 172 includes a plurality of layers, last one of which is a SoftMax layer. Therefore, the sum of outputs corresponding to the eight different languages becomes 1, which can be treated as probabilities 174. The language identifying models 182 and 184 have substantially the same configuration as language identifying model 180, whereas difference in input size leads to difference in their configurations (for example, the number of the nodes of the input layers).

Language identifying models 180, 182 and 184 are each trained beforehand by using a combination of huge amount of speech signals in the eight different languages and correct answer data of languages represented by the speeches of the speech signals. Speech signals of different sizes are used for different models. In the present embodiment, the correct data is a vector having eight elements, of which the element corresponding to the correct language has the value 1 and others have the value 0. The training itself is possible through common back propagation for the neural networks. Larger amount of training data enables higher accuracy of language identification and, hence, it is important to collect sufficient amount of training data.

Language determining unit 134 includes: a model selecting unit 190 receiving inputs of probabilities 174 from language identifying model 180, probabilities 176 from language identifying model 182 and probabilities 178 from language identifying model 184, and for selecting one set designated by an external signal from these three sets of probabilities of the three different models; a language selecting unit 200 for extracting probabilities of three selected languages stored in selected language storage unit 128 from the probabilities of eight languages included in the set of probabilities selected by model selecting unit 190; and a probability normalizing unit 202 for normalizing the probabilities of the three languages selected by language selecting unit 200 and outputting the results as probabilities. Probability normalizing unit 202 calculates the sum of three probabilities, and the value obtained by dividing the probability of each language by the sum is used as the probability of that language. The sum of thus calculated probabilities becomes 1.

Language determining unit 134 further includes: a maximum probability selecting unit 204 for selecting and outputting the highest probability from the three probabilities normalized by probability normalizing unit 202; a threshold comparing unit 206 for determining whether the probability selected by the maximum probability selecting unit 204 is equal to or higher than a prescribed threshold and for outputting the result of determination; a language determining unit 208 for receiving the normalized probabilities output from the probability normalizing unit 202, the maximum probability output from the maximum probability selecting unit 204 and the result of comparison from threshold comparing unit 206, for making a trial to identify a language from these, and if a language is successfully identified, for applying the result to change-of-language determining unit 136 (FIG. 2) and applying a completion signal showing the determination has been completed to change-of-language determining unit 136 and to speech partner language storage unit 122 (FIG. 2), and if language identification fails, for storing normalized probabilities of respective languages at that time in a probability storage unit 194, incrementing a counter 196 by 1, and instructing language selecting unit 200 to select an output of the next language selecting model and to execute the similar process, and a threshold storage unit 192 for storing the threshold to be compared by threshold comparing unit 206. The threshold is determined in advance through experiments so that desirable accuracy and latency can be attained. Preferably, the threshold is at least 0.5, more preferably at least 0.8 and further preferably, at least 0.85.

Figure 4:
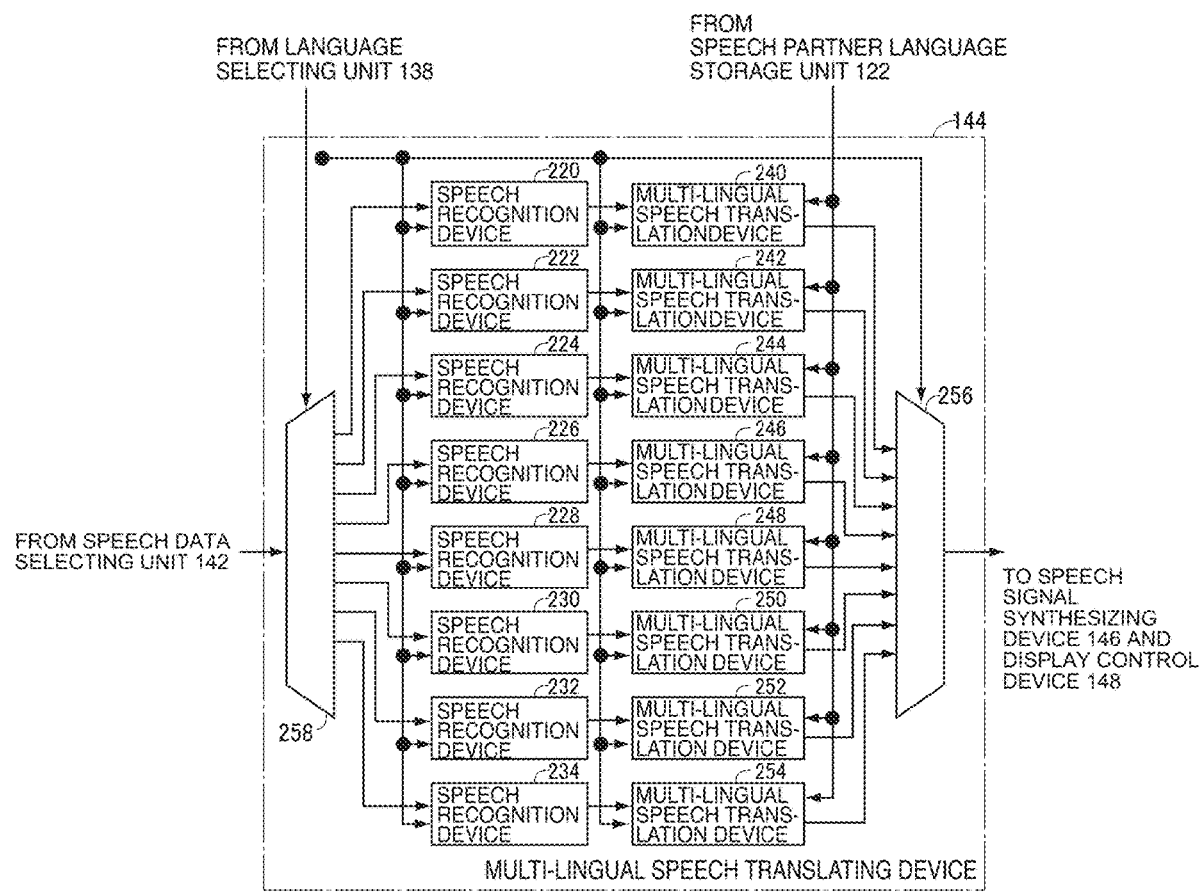
FIG. 4 is a block diagram schematically showing a configuration of a multi-lingual speech translating device used by a multi-lingual speech processing device in accordance with the first embodiment of the present invention.

FIG. 4 is a block diagram schematically showing a configuration of a multi-lingual speech translating device 144 used by a multi-lingual speech processing device in accordance with the first embodiment of the present invention. Referring to FIG. 4, the multi-lingual speech translating device 144 includes: speech recognition devices 220, . . . 234 for eight different languages prepared beforehand for the eight languages; eight different multi-lingual translation devices 240, . . . , 254 for respectively receiving texts of speech recognition results output from these speech recognition devices 220, . . . , 234, capable of translating the texts output from the corresponding speech recognition device from the language of the speech recognition device to remaining seven different languages, and from these, outputting the translation of the language designated by the speech partner language storage unit 122; a data distributing unit 258 for receiving speech data vector sequence given from the speech data selecting unit 142 shown in FIG. 2 and for applying the speech data vector sequence to that one of the speech recognition devices 220 . . . . 234, which is designated by the language selecting signal from language selecting unit 138; and an output selecting unit 256 connected to receive outputs from each of multi-lingual translation devices 240, . . . 254, for selecting the result of speech processing designated by the language selecting signal from language selecting unit 138 and for applying the parameters for speech synthesis to the speech signal synthesizing device 146 and for applying the text as a result of speech processing to the display control device 148, respectively.

Figure 5:
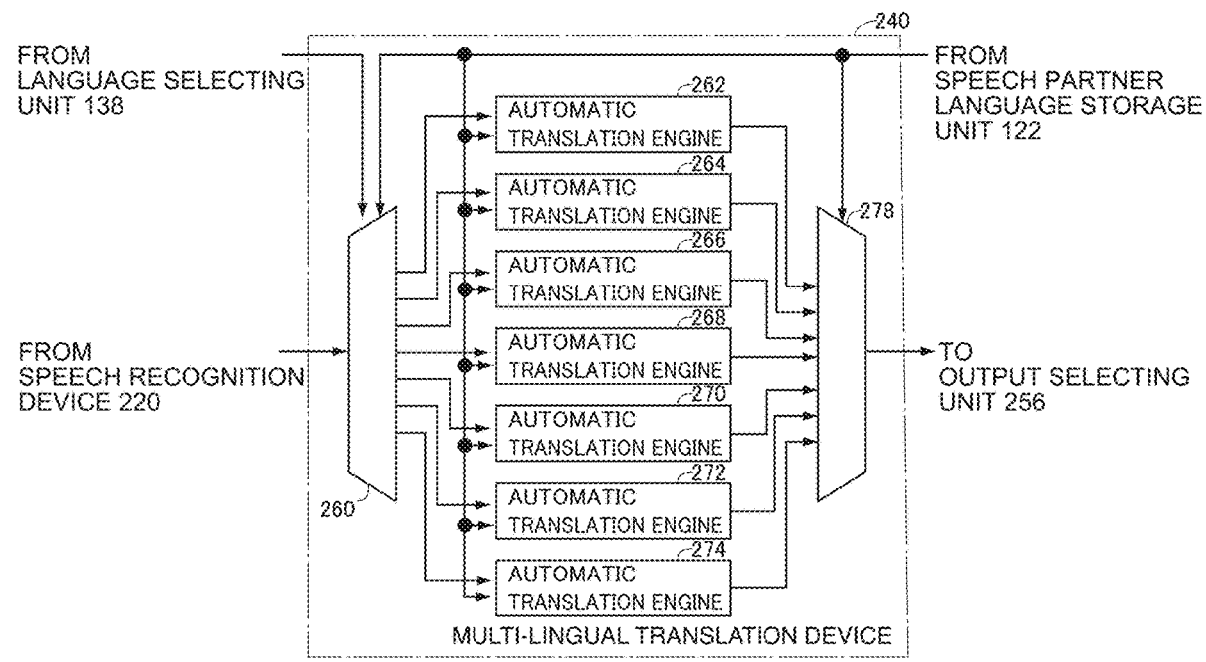
FIG. 5 is a block diagram schematically showing a configuration of one auto-translating device shown in FIG. 4.

Referring to FIG. 5, multi-lingual translation device 240 includes: seven automatic translation engines 262, . . . , 274 all connected to receive a speech partner language selection signal from the speech partner language storage unit 122 for translating a sentence of the language corresponding to this multi-lingual translation device 240 to other seven languages; a translation engine selecting unit 260 for receiving the language selection signal from language selecting unit 138 and a signal representing the speech partner's language from speech partner language storage unit 122, respectively, operating only when selected by language selecting unit 138, for executing a process of applying the text output from speech recognition device 220 to that one of automatic translation engines 262, . . . , 274 which corresponds to the speech partner language selecting signal from the speech partner language storage unit 122, and an output selecting unit 278 connected to receive the speech partner language selecting signal from the speech partner language storage unit 122, for selecting an output of that one of automatic translation engines 262, . . . , 274 which is selected by the speech partner language selecting signal, and applying the output as the output from multi-lingual translation device 240 to output selecting unit 256 shown in FIG. 4.

Figure 6:
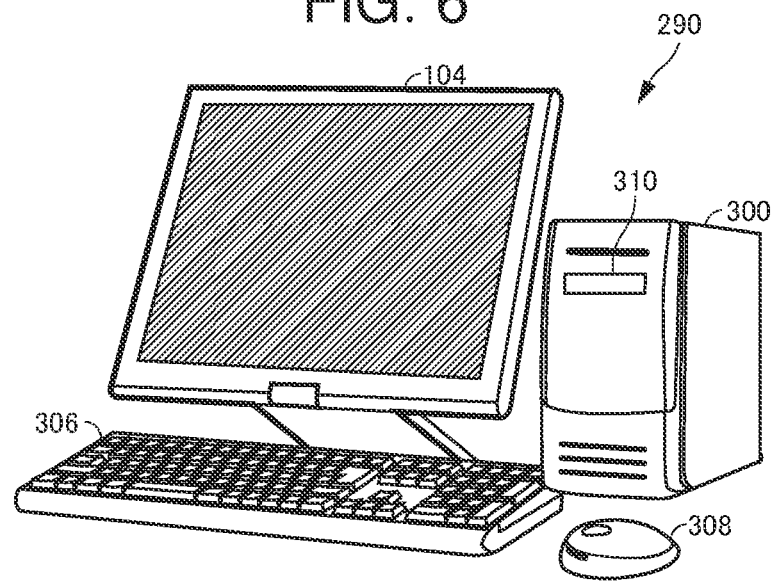
FIG. 6 shows an appearance of a computer system realizing the multi-lingual speech processing device in accordance with the first embodiment of the present invention.

FIG. 6 shows an appearance of an example of computer system 290 realizing the multi-lingual speech processing device 100 described above, and FIG. 7 is a hardware block diagram of an example of a computer forming the computer system 290.

Referring to FIG. 6, computer system 290 includes: a computer 300 having a DVD (Digital Versatile Disk) drive 310, and a keyboard 306, a mouse 308 and a monitor 104 all connected to computer 300.

Figure 7:
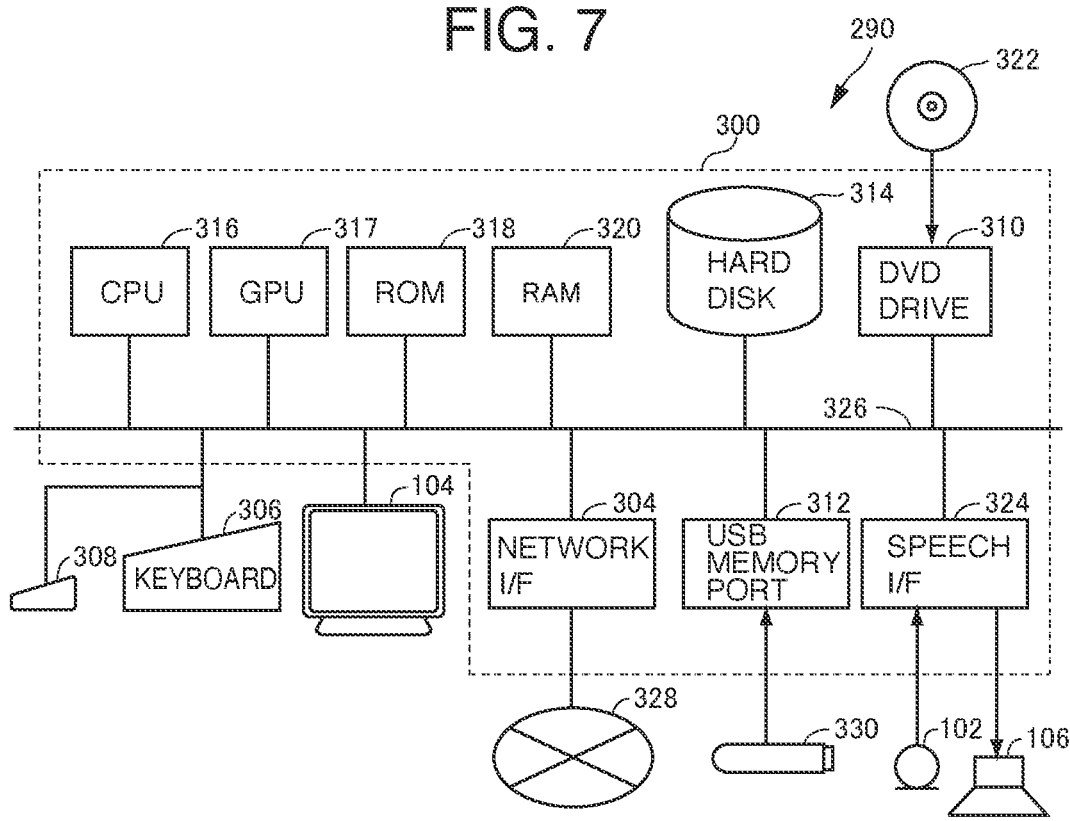
FIG. 7 is a block diagram showing a hardware configuration of the computer system shown in FIG. 6.

Referring to FIG. 7, in addition to DVD drive 310, computer 300 includes: a CPU 316, a GPU (Graphic Processing Unit) 317, a bus 326 connected to CPU 316, GPU 317 and DVD drive 310, an ROM 318 connected to bus 326 and storing a boot program of computer 300 and the like, an RAM 320 connected to bus 326 and storing program instructions, a system program and work data, and a hard disk drive (HDD) 314, which is a non-volatile memory connected to bus 326. Hard disk 314 is for storing, for example, programs executed by CPU 316 and GPU 317 and data used by the programs executed by CPU 316 and GPU 317. Computer 300 further includes a network 1F 304 providing connection to a network 328 enabling communication with other terminals, and a USB memory port 312 to which a USB memory 330 can be loaded, enabling communication with USB memory 330 and various units in computer 300.

Computer 300 further includes: a speech/F 324 connected to microphone 102, speaker 106 and bus 326, for reading a speech signal generated by CPU 316 and stored in RAM 320 or HDD 314 in accordance with an instruction from CPU 316, performing analog conversion and amplification to drive speaker 106, and digitizing an analog speech signal from microphone 102 and saving it at any address of RAM 320 or HDD 314 designated by CPU 316.

In the embodiment above, basic information setting unit 120, speech partner language storage unit 122, language setting unit 124 and default language storage unit 126 shown in FIG. 2 are all implemented by HDD 314 or RAM 320. Typically, these are written externally to HDD 314, loaded to RAM 320 when executed by computer 300, and saved regularly in hard disk 314 as a backup.

The speech signal as an object of processing may be held in computer 300 by any means. Generally, the speech signal is transmitted from another computer on network 328 to computer 300 through network/F 304, and stored in RAM 320 or HDD 314.

The computer program causing the computer system to operate as multi-lingual speech processing device 100 and various components thereof is stored in a DVD 322 loaded to DVD drive 310 and transferred from DVD drive 310 to HDD 314. Alternatively, the program is stored in USB memory 330, the USB memory 330 is loaded to USB memory port 312, and the program is transferred to hard disk 314. Alternatively, the program may be transmitted to computer 300 through network 328 and stored in HDD 314. At the time of execution, the program is loaded on RAM 320. A source program may be typed using keyboard 306, mouse 308 and monitor 104, compiled by a compiler and an object program output therefrom may be stored in HDD 314. When a script language is used, the scripts as the program realizing the above-described process may be input by using, for example, keyboard 306 and may be stored in HDD 314.

CPU 316 reads the program from RAM 320 in accordance with an address indicated by a register (not shown) referred to as a program counter provided therein, interprets an instruction, reads data required in executing the instruction from RAM 320, hard disk 314 or other devices in accordance with the addresses designated by the instruction, and executes the process designated by the instruction. CPU 316 stores data as a result of execution at addresses designated by the program of RAM 320, hard disk 314, register in CPU 316 or the like. Here, the value of program counter is also updated by the program. The computer program may be directly loaded to RAM 320 from DVD 322, USB memory 330 or through a network. Of the programs executed by CPU 316, some tasks (mainly, numerical calculations) may be dispatched to GPU 317 in accordance with instructions in the programs or in accordance with a result of analysis during execution of instructions by CPU 316.

The program realizing various functions of computer 300 includes a plurality of instructions causing the computer to carry out operations of various devices as described above. Some of the basic functions necessary to cause the computer 300 to realize these operations are provided by the operating system (OS) running on computer 300, by third party programs, or by modules of various tool kits, installed in computer 300. Therefore, the program may not necessarily include all of the functions necessary to realize the system and method of the present embodiment. The program has only to include instructions to realize the operations of the above-described devices and their components by calling appropriate functions or appropriate "program tool kits" in a manner controlled to attain desired results. Method of operation of computer 300 is well known and, therefore, description will not be given here. GPU 317 is capable of parallel processing and it can execute the speech recognition process, the automatic translation process and the speech synthesizing process for a large amount of speech data in parallel simultaneously or in a pipelined manner.

Figure 8:
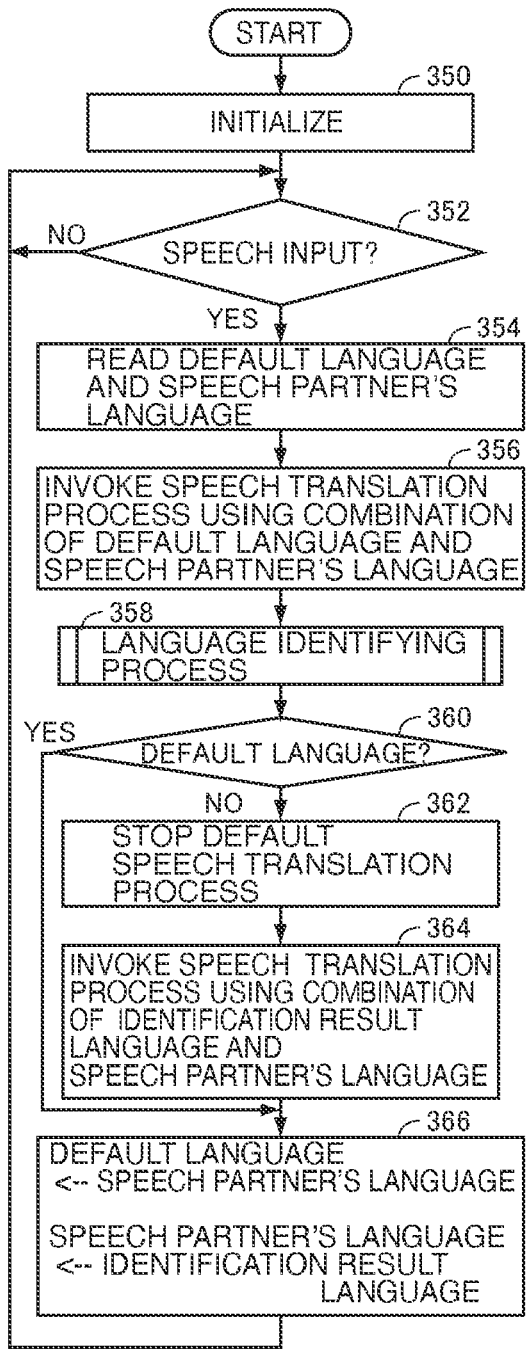
FIG. 8 is a flowchart showing a control structure of a computer program that causes the computer shown in FIG. 6 to function as the speech processing device in accordance with the first embodiment.

FIG. 8 is a flowchart showing a control structure of a computer program that causes the computer shown in FIG. 6 to function as the speech processing device in accordance with the first embodiment. It is noted that the language identifying neural network 132 and multi-lingual speech translating device 144 are executed by processes separate from this program.

Referring to FIG. 8, the program includes: a step 350 of initialization at the time of activating the program; a step 352 of determining whether or not a speech is input and waiting until a speech is input; a step 354, responsive to a speech input, of reading the default language from default language storage unit 126 of FIG. 2 and the speech partner's language from speech partner language storage unit 122, respectively; a step 356 of activating the multi-lingual speech translating device 144 with the combination of languages read at step 354 (from default language to speech partner's language); and a step 358 of activating the language identifying process by the language identifying neural network 132.

As can be seen from FIG. 2, an output of the speech processing device 130 is simultaneously applied to the speech data selecting unit 142 and the language identifying neural network 132. When the program is invoked, the output of language determining unit 134 selects the default language. Therefore, to language identifying neural network 132 and multi-lingual speech translating device 144, the same speech data is applied simultaneously. Since the speech translation process is invoked at step 356 and the language identifying process is invoked at step 358, these two processes will run in parallel thereafter.

The program further includes: a step 360 following step 358, of determining whether or not the identified language matches the default language stored in default language storage unit 126 shown in FIG. 2 and branching the control flow in accordance with the result of determination; a step 362, executed if the result of determination at step 360 is negative, of designating the translation target language as the default language and stopping the speech translation process invoked at step 356; and a step 364 of activating the speech translation process by multi-lingual speech translating device 144, designating a combination of the language as the result of identification and the speech partner's language stored in speech partner language storage unit 122 shown in FIG. 2 (speech translation from the identification result language to the speech partner's language).

The program further includes: a step 366 executed after step 364 or if the determination at step 360 is positive, of storing the speech partner's language stored in speech partner language storage unit 122 shown in FIG. 2 in default language storage unit 126 and storing the identification result language output from language selecting unit 138 in speech partner language storage unit 122 and returning the control flow to step 352.

Figure 9:
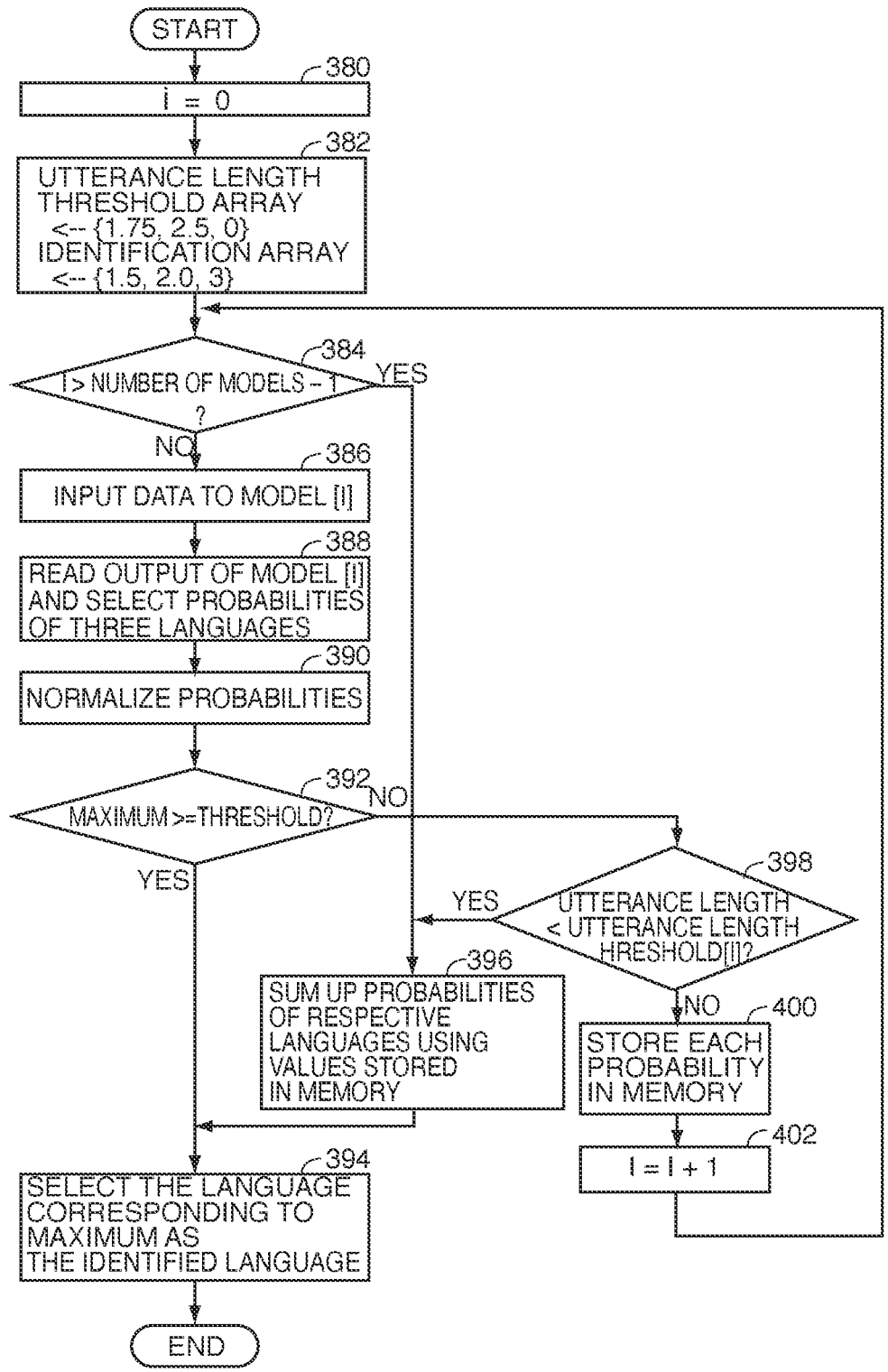
FIG. 9 is a flowchart showing a control structure of a part of the program of which control structure is shown in FIG. 8.

FIG. 9 is a flowchart representing a part of a program routine executed at step 358 as a part of the program of which control structure is shown in FIG. 8. This program realizes the progressive type language identification, which will be described later. Referring to FIG. 9, the program routine includes: a step 380 of setting a variable i to zero that controls the iteration process for regulating the progressive language identifying process, a step 382 of inputting values 1.75, 2.5, 0} corresponding to 1.75, 2.5 and 0 seconds, respectively, in an utterance length threshold sequence prepared as the thresholds of utterance length for determining whether or not a language identifying model is to be switched, in the progressive language identifying process; and a step 384 of determining whether the value of variable i is larger than the value corresponding to the number of models used on the progressive language identifying process minus 1, and branching the control flow in accordance with the result of determination. At step 382, an array of three elements specifying an identifying model (hereinafter referred to as a "model array") is also prepared, and identification information of each identifying model is stored. Here, input utterance lengths to three identifying models are used as the identification information, and values {1.5, 2.0, 3.0} representing lengths of input speech data to respective identifying models are stored in the model array.

The program further includes; a step 386 executed if the determination at step 384 is negative, of inputting to model [i], speech data of the input speech length corresponding to that model; a step 388 following step 386, of selecting the probabilities of the prescribed three languages from the probabilities of respective languages output from model [i]; a step 390 of normalizing the probability values of the three languages selected at step 388; a step 392 of determining whether or not the maximum of the probabilities normalized at step 390 is equal to or larger than the threshold, and branching the control flow in accordance with the result of determination; and a step 394 executed if the determination at step 392 is positive, of 540 determining the language corresponding to the maximum to be the identified language, this information and ending the process.

The program further includes: a step 398, executed if the result of determination at step 392 is negative, of determining whether or not the utterance length of input utterance is shorter than the utterance length threshold [i], and branching the control flow in accordance with the result of determination; a step 400, executed when the result of determination at step 398 is negative, of storing the probabilities of three languages normalized at step 390 in probability storage unit 194 (see FIG. 3); and a step 402 of adding 1 to the value of variable i and directing the control flow back to step 384.

The program further includes: a step 396, executed when the determination at step 384 is positive (when the value of variable i is larger than the number of models −1), and when the determination at step 398 is positive (when the utterance length is shorter than the utterance length threshold [i]), of integrating probabilities of respective languages stored in the probability storage unit 194 (see FIG. 3), thereby determining the final identified language, and returning the control flow to step 394.

At step 396, regarding probabilities of respective languages stored, for example, in a memory, an average of each language is calculated. Here, at step 394, if the maximum of the averages is smaller than the threshold used at step 392, the language corresponding to the maximum is determined to be the identified language.

Figure 10:
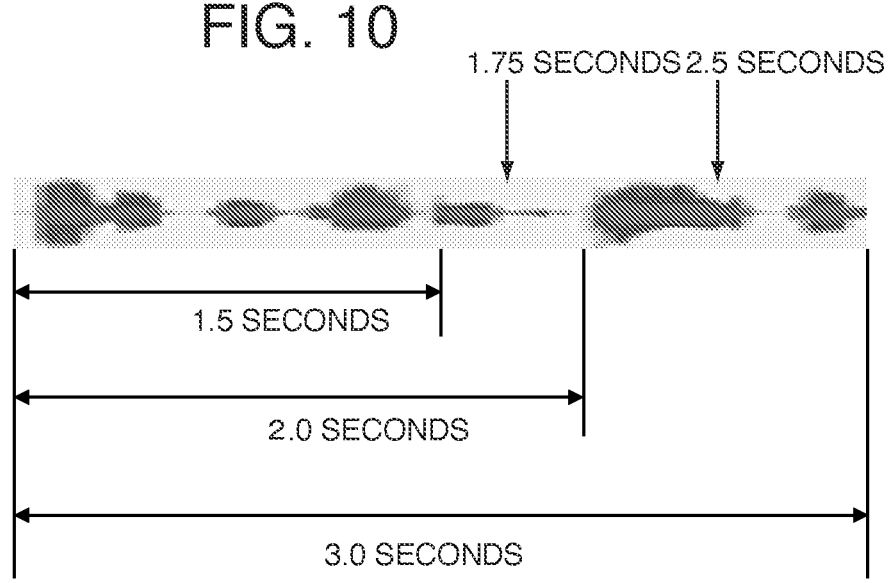
FIG. 10 is schematic illustration showing an outline of progressive language identification by the speech processing device in accordance with a first embodiment of the present invention.

FIG. 10 shows relations of utterance lengths processed by the three different language identifying models and the utterance length thresholds used at step 398 of FIG. 9. Referring to FIG. 10, the language identifying model 180 uses a speech of 1.5 seconds from the start of utterance to identify the language. The language identifying model 182 uses a speech of 2.0 seconds from the start of utterance to identify the language. The language identifying model 184 uses a speech of 3.0 seconds from the start of utterance to identify the language. When language identification by language identifying model 180 fails, language identification by language identifying model 182 is tried, and if it fails, language identifying model 184 is used to identify the language.

If identification by language identifying model 180 fails and the utterance length is shorter than 2.0 seconds, it is highly likely that identification of language by language identifying model 182 also fails. Therefore, in the present embodiment, if identification by language identifying model 180 fails and utterance length is shorter than 1.75 seconds as shown in FIG. 10, language identification by language identifying model 182 is not executed, and the language is identified by using the probabilities calculated by language identifying model 180. Similarly, if identification by the language identifying model 182 fails and the utterance length is shorter than 2.5 seconds as shown in FIG. 10, the language identification by the language identifying model 184 is not executed, and the language is identified by using the probabilities calculated by the language identifying models 180 and 182. Here, there is no problem if the maximum of probabilities calculated in this manner is larger than the threshold. Even if it is smaller than the threshold, however, the language corresponding to the maximum is determined to be the result of language identification.

As described above, if the language identification fails with a short utterance, language identification is successively tried using subsequent speech data. Such a method is referred to as the progressive method in this specification.

The normalization process executed at step 390 of FIG. 9 is for re-calculating the probabilities of respective languages by dividing the probability of each language by the sum of the probabilities of the three languages.

<Operation>

Multi-lingual speech processing device 100, of which structure has been described above, operates in the following manner. When multi-lingual speech processing device 100 is activated, the speech partner language storage unit 122 stores the language used by the user of multi-lingual speech processing device 100 in the basic information stored in the basic information setting unit 120. In default language storage unit 126, of the languages stored in language setting unit 124, a language tentatively selected by the user as the language of speech input is stored. Even when the user does not clearly know the language of the speech partner, he/she may guess and set a language in default language storage unit 126.

In the following operation, it is assumed that the dialogue starts not from the user but from the counterpart or speech partner. In the actual dialogue process, it is 610 necessary to have the speech partner speak first, as a process for estimating the partner's language. For this purpose, it is preferred to display text meaning "please speak something in your own language" in several languages on the screen. Such a display in English, for example, may help the speech partner not to be confused or embarrassed.

Referring to FIG. 2, when the speech partner starts to speak, microphone 102 converts the speech to a speech signal, which is applied to speech processing device 130 shown in FIG. 2. Speech processing device 130 receives this speech signal, digitizes and frames and thereby converts the signal to a time series of speech data vectors, which is applied to the language identifying neural network 132, speech data selecting unit 142 and buffer 140. Buffer 140 temporarily stores the speech data Here, referring to FIG. 3, the speech data of 1.5 seconds from the beginning of utterance, the speech data of 2.0 seconds from the beginning of utterance, and the speech data of 3.0 seconds from the beginning of utterance, are applied to language identifying models 180, 182 and 184, respectively, in the language identifying neural network 132.

On the other hand, referring to FIG. 2, change-of-language determining unit 136 sets language selecting unit 138 and speech data selecting unit 142 such that speech data can be processed in the default language at the time of activation. Specifically, language selecting unit 138 selects an output of the default language storage unit 126 and applies it to the multi-lingual speech translating device 144 and the speech signal synthesizing device 146. Information related to the default language is also applied to the speech partner language storage unit 122, while the speech partner language storage unit 122 takes in the output of the language selecting unit 138 only when the language is determined by the language determining unit 134. Therefore, in the speech partner language storage unit 122, the user language is kept stored. This value is applied to multi-lingual speech translating device 144 and speech signal synthesizing device 146 (step 354 of FIG. 8). Speech data selecting unit 142 selects not the output of buffer 140 but the output of speech processing device 130 and applies it to multi-lingual speech translating device 144.

As a result, multi-lingual speech translating device 144 starts speech processing, assuming that the speech data applied from speech processing device 130 through speech data selecting unit 142 represents a speech in the language stored in the default language storage unit 126 (step 356 of FIG. 8).

Referring to FIG. 4, the specific operation of multi-lingual speech translating device 144 is as follows. Data distributing unit 258 distributes the speech data from speech data selecting unit 142 to that one of the speech recognition devices 220, . . . , 234 which is designated by the language selecting signal from language selecting unit 138, and not to other devices. Further, speech recognition devices 220, . . . , 234 all receive the language selecting signal from the language selecting unit 138, and only that device which processes the language designated by the language selecting signal (for example, speech recognition device 220) operates.

Of the speech recognition devices 220, . . . , 234, that one which is designated by the language selecting signal applies the recognized text to the corresponding multi-lingual translation devices 240. In the following, by way of example, it is assumed that speech recognition device 220 is designated by the language selecting signal, performs speech recognition of speech data from speech data selecting unit 142 and applies the resulting text to multi-lingual translation device 240, and that multi-lingual translation device 240 performs the translation process.

Referring to FIG. 5, to translation engine selecting unit 260 of multi-lingual translation device 240, the language selecting signal from language selecting unit 138 and the signal indicating the speech partner's language from speech partner language storage unit 122 are applied. Translation engine selecting unit 260 applies the text output from speech recognition device 220 to that one of automatic translation engines 262, . . . , 274 which corresponds to the speech partner's language from speech partner language storage unit 122, only when it is selected by language selecting unit 138.

The speech partner language selecting signal from the speech partner language storage unit 122 is applied to all automatic translation engines 262, . . . , 274, and only that one which is selected by the speech partner language selecting signal performs the automatic translation. In the example shown in FIG. 5, if the automatic translation engine 262, for example, is selected by the speech partner language selecting signal, automatic translation engine 262 is selected by translation engine selecting unit 260, and the output of speech recognition device 220 is applied to automatic translation engine 262. Automatic translation engine 262 automatically translates the input text to the partner's language. The partner's language matches the speech partner's language stored in speech partner language storage unit 122.

The speech partner language selecting signal from speech partner language storage unit 122 is also applied to output selecting unit 278, and output selecting unit 278 selects the output of that one of the automatic translation engines 262 . . . . , 274 which is selected by the speech partner language selecting signal, and applies it as the output of multi-lingual translation device 240 to output selecting unit 256 shown in FIG. 4.

Output selecting unit 256 selects the output of that one of the multi-lingual translation devices (for example, multi-lingual translation device 240) which corresponds to the language designated by the language selecting signal from language selecting unit 138, and outputs it to speech signal synthesizing device 146 and display control device 148.

Specifically, multi-lingual speech translating device 144 operates to perform speech recognition of input speech data, to automatically translate, and to generate parameters for speech synthesis and successively outputs these.

On the other hand, language identifying models 180, 182 and 184 of language identifying neural network 132 all start the process of identifying the language represented by the speech data (step 358 of FIG. 8), simultaneously with multi-lingual speech translating device 144. These models need utterance lengths of 1.5, 2.0 and 3.0 seconds, respectively, which utterances are processed from the beginning by speech processing device 130 shown in FIG. 2 and stored as speech data vector sequences. At the time point when 1.5 seconds of speech data are stored, the data are input to language identifying model 180. Similarly, at the time point when 2.0 seconds of speech data are stored, the data are input to language identifying model 182, and when 3.0 seconds of speech data are stored, the data are input to language identifying model 184. If an utterance is shorter than 1.75 seconds or 2.5 seconds, information thereof is stored by a flag, not shown.

Language identifying models 180, 182 and 184 output respective results of identification (probabilities 174, 176 and 178 shown in FIG. 3). Here, the time necessary for language identifying model 180 to start the identifying process is shorter than the remaining two models and the result can be obtained most quickly. The time necessary for language identifying model 182 to start the identifying process is longer than the language identifying model 180 but shorter than the language identifying model 184 and, therefore, the result is obtained after the identification result of 180 is obtained and before the identification result of 184 is obtained. The identification result of language identifying model 184 is obtained last.

Language determining unit 134 shown in FIG. 3 executes the language identifying process in the following manner, using the probabilities output from these language identifying models 180, 182 and 184. In the following, for simplicity of description, the operation of language determining unit 134 will be described assuming that the utterance is longer than 2.5 seconds.

Referring to FIG. 3, when an utterance is detected, first, language determining unit 208 initializes the value of counter 196 to zero (step 380 of FIG. 9). Then, language determining unit 208 applies 1.5 seconds of speech data to the model (in this example, language identifying model 180) determined by the value (=zero) of counter 196 (step 386), and controls model selecting unit 190 such that it selects the output therefrom (step 388). Model selecting unit 190 selects probabilities 174 output from language identifying model 180 and applies them to language selecting unit 200. Language selecting unit 200 selects the probabilities related to the three languages stored in the selected language storage unit 128 from the probabilities 174 of eight languages output from language identifying model 180 (step 388 of FIG. 9), and applies these to probability normalizing unit 202. Probability normalizing unit 202 calculates the sum of probabilities of the three languages and divides each probability by the sum, thereby normalizing the probabilities related to the three languages (step 390 of FIG. 9). Maximum probability selecting unit 204 selects the maximum of these, and threshold comparing unit 206 compares the maximum with the threshold (step 392 of FIG. 9). If the maximum is equal to or larger than the threshold (YES at step 392), threshold comparing unit 206 applies a signal indicating that the probability of language corresponding to the maximum is equal to or higher than the threshold, to language determining unit 208. Language determining unit 208 determines whether or not the language corresponding to the maximum probability is the language of the speech data, based on the normalized probabilities of three languages output from probability normalizing unit 202, the maximum probability output from the maximum probability selecting unit 204 and the result of comparison by the threshold comparing unit 206. In the present embodiment, basically, if the maximum probability is equal to or larger than the threshold, the language corresponding to the probability is determined to be the identified language. If none of the probabilities is equal to or larger than the threshold, probabilities of respective languages of the past one or two determinations carried out in the progressive manner are integrated with the current probabilities (for example, an average is calculated), and the language corresponding to the largest of the results is determined to be the identified language, no matter whether the value is equal to or larger than the threshold. If it is determined to be the language of speech data, language determining unit 208 outputs the value to the change-of-language determining unit 136. Further, language determining unit 208 outputs a signal indicating the end of identification to change-of-language determining unit 136 and to speech partner language storage unit 122. Thus, language identification ends.

If the maximum of probability is smaller than the threshold, the identification result is considered to be unreliable, so that the probabilities of three languages output from probability normalizing unit 202 are stored in probability storage unit 194, the value of variable i stored in counter 196 is incremented to 1, and model selecting unit 190 is controlled such that the next language identifying model, that is, language identifying model 182, is selected.

When the probability 176 as the result of identification by language identifying model 182 is output, model selecting unit 190 selects it and applies to language selecting unit 200. Then, the same process as described above is executed.

When it is still impossible to determine the language by the result of identification by language identifying model 182, language determining unit 208 increments the counter 196 to two, and controls the model selecting unit 190 such that the probability 178 as the output of language identifying model 184 is selected. Model selecting unit 190 selects the probability 178 from the language identifying model 184 and applies it to the language selecting unit 200. Then, the same process as described above through the process performed by determining unit 208 is executed.

If the determination of the process at step 392 in FIG. 9 is still negative with the result of the language identifying model 184, the process proceeds in the following manner. Here, while the control proceeds to step 398, i=2 and utterance threshold [2]=0. Therefore, the determination at step 398 of FIG. 9 is always negative, and steps 400 and 402 are executed. At step 384 at the beginning of the subsequence loop process, the determination becomes negative and through steps 396 and 394, the language is identified.

In language determining unit 208, if the maximum of the probabilities is equal to or larger than the threshold, the language corresponding to the probability is output as the result of language identification to change-of-language determining unit 136 as in the other cases described above, and a signal indicating the end of language identification is output to change-of-language determining unit 136 and speech partner language storage unit 122. This is the same as when i=0 and i=1.

If the maximum is smaller than the threshold, however, language determining unit 208 operates in the following manner. Specifically, in this case, language determining unit 208 integrates probabilities of respective languages stored so far in probability storage unit 194. By way of example, it calculates an average of probabilities of each language, to be used as the integrated probability of that language. The language having the maximum integrated probability is determined to be the language of the utterance data. In this case, determination is made even if the probability of the language is smaller than the threshold. The reason for this is that an output must be provided in some way or another in a prescribed time period as the device is designed to be used for dialogue.

If the utterance is shorter than 1.75 seconds, the above-described identifying process is executed using only the result of language identifying model 180. Here, even when the maximum of the final probabilities is smaller than the threshold, the result of language identification is output as in the case when i=2 described above. The operation is the same when the utterance is shorter than 2.5 seconds, and the identifying process is executed using only the results of the language identifying models 180 and 182. Here again, if the maximum of the final probabilities is smaller than the threshold even when the result of language identifying model 182 is used, the probabilities of the respective languages stored by that time are integrated for each language (for example, an average is calculated) as in the case when i=2, and the language having the highest probability is determined to be the result of identification. It is not required that the value is equal to or higher than the threshold.

Again referring to FIG. 2, in response to a signal from the language determining unit 134 indicating the end of identification, the change-of-language determining unit 136 compares the default language stored in the default language storage unit 126 with the language as the result of identification output by the language determining unit 134, and applies a determination signal indicating whether the language is the same or changed, to the language selecting unit 138 and the speech data selecting unit 142. The value of the determination signal assumes the first value when the language is the same, and the second value when the language is changed. In the following, the operation of the multi-lingual speech processing device 100 when the language of the identification result is the same as the default language and when not will be described.

—When Identification Result Language Matches Default Language—

When the determination signal of the change-of-language determining unit 136 has the first value, the language selecting unit 138 selects the output of the default language storage unit 126, and applies it to the speech partner language storage unit 122, the multi-lingual speech translating device 144 and the speech signal synthesizing device 146. Here, the same information as originally given is applied to the multi-lingual speech translating device 144 and the speech signal synthesizing device 146.

In response to the determination signal having the first value applied from the change-of-language determining unit 136, the speech data selecting unit 142 continues the process of applying the speech signal from speech processing device 130 to the multi-lingual speech translating device 144.

Since the value of the language selecting signal from the language selecting unit 138 is not changed, the data distributing unit 258 shown in FIG. 4 continuously applies the speech data to that one of the speech recognition devices 220, . . . , 234 to which it has originally applied the speech data. Similarly, the translation engine selecting unit 260 (FIG. 5) of that one of multi-lingual translation devices 240, . . . 254 shown in FIG. 4 which has been operating in accordance with the default value continues applying the result of speech recognition to the same translation engine. Further, since the value of speech partner language selection signal from the speech partner language storage unit 122 is not changed, the automatic translation engine selected by the speech partner language selection signal in the multi-lingual translation device operating in accordance with the default language selecting signal also continues its operation. Other speech recognition devices and automatic translation devices do not operate. The same applies to the output selecting unit 256. That is, it selects the outputs of that speech recognition device and the multi-lingual translation device which have been operating before the identification result is determined, and applies the outputs to speech signal synthesizing device 146 and display control device 148.

Referring to FIG. 2, speech signal synthesizing device 146 and display control device 148 continue processes for the result of speech translation of the same language as before, output from multi-lingual speech translating device 144.

Thereafter, the speech partner's language stored in speech partner language storage unit 122 is stored in the default language storage unit 126, and the information representing the language of the new identification result that has been applied from language selecting unit 138 is stored in the speech partner language storage unit 122.

When there is a new speech input, speech processing newly starts, designating the default language stored in default language storage unit 126 and the speech partner's language stored in speech partner language storage unit 122.

—When Identification Result Language does not Match Default Language—

Here, two inputs do not match and in response, the change-of-language determining unit 136 applies the determination signal having the second value to the language selecting unit 138 and the speech data selecting unit 142. In response to this determination signal, the language selecting unit 138 selects the language as the result of identification output from the language determining unit 134 and applies it to the speech partner language storage unit 122, the multi-lingual speech translating device 144 and the speech signal synthesizing device 146.

In response to the determination signal from change-of-language determining unit 136, speech data selecting unit 142 selects the output of buffer 140 and applies it to multi-lingual speech translating device 144.

Referring to FIG. 4, the data distributing unit 258 applies the output of the speech data selecting unit 142 to the speech recognition device and the automatic translation device representing the new language of identification result applied from the language selecting unit 138, switching from the speech recognition device and the automatic translation device that have been selected until that time.

Of the speech recognition devices 220, . . . , 234, that one which has executed the speech translation process by that time stops the speech recognition process, as the value of selection signal from language selecting unit 138 has changed. The same applies to the multi-lingual translating devices. On the other hand, of the speech recognition devices 220, . . . , 234, that one which is designated by the new selection signal starts processing from the beginning of the buffered speech data, applied from data distributing unit 258. Further, the multi-lingual translating device that receives the output of the speech recognition device starts its operation, and that one of the automatic translation engines therein which is determined by the speech partner language selection signal starts translation. The result of translation is output by the output selecting units 278 and 256.

Thereafter, the output of that device which newly started processing is applied to the speech signal synthesizing device 146 and the display control device 148 shown in FIG. 2. Based on the speech synthesizing parameters output from the multi-lingual speech translating device 144, the speech signal synthesizing device 146 synthesizes a speech signal in the speech partner's language stored in speech partner language storage unit 122 and applies the signal to speaker 106.

When the process for the input speech data ends, the speech partner's language that has been stored in speech partner language storage unit 122 is stored in default language storage unit 126 and used as the default language, while the language of the identification result output from the language selecting unit 138 is stored in the speech partner language storage unit 122 and used as the target language of the speech translation process for the next speech.

The operation of multi-lingual speech processing device 100 described above will be summarized. First, when a speech partner of a user utters, speech recognition starts assuming that the utterance is in the default language. The result of the speech recognition is output. If the result of language identification matches the default language, the process continues, and the results of speech recognition are automatically translated successively to the language (user's language) stored in the speech partner language storage unit 122. From the results of automatic translation, a speech is synthesized and output.

On the other hand, if the identification result of language does not match the default language, speech recognition is interrupted, the language is switched to the language of the identification result, and the process of speech recognition, automatic translation and speech synthesis starts on the speech data that has been stored in buffer When the process for the speech ends, the default language is set to the language that has been the partner's language in the preceding process, and the partner's language is set to the language of the identification result. As a result, when the user of the multi-lingual speech processing device 100 switches from the partner and starts utterance, assuming that the language identification succeeds, it follows that the language of the identification result matches the default language, the speech processing started by multi-lingual speech translating device 144 will not be interrupted and an output will be provided quickly.

When processing for the speech ends, the partner's language and the default language are switched this time and the speech in the partner's language is translated to the default language speech. This time, the partner's language matches the identified language and, therefore, the speech translation process started by multi-lingual speech translating device 144 continues without interruption, and the result of speech translation can be obtained quickly.

Figure 11:
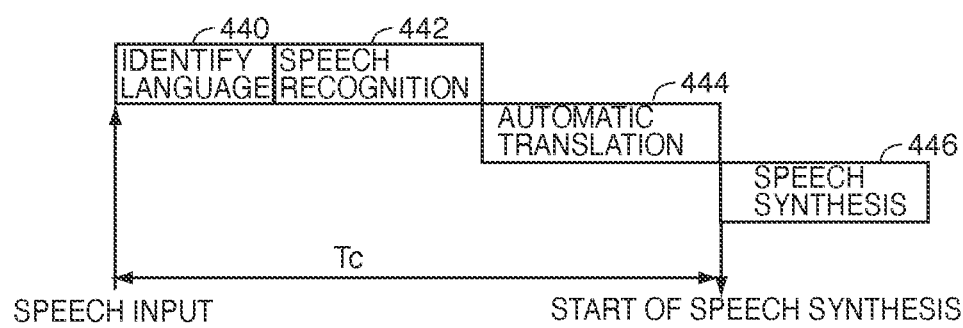
FIG. 11 is a schematic illustration showing time course of speech processing in accordance with a conventional method.
Figure 12:
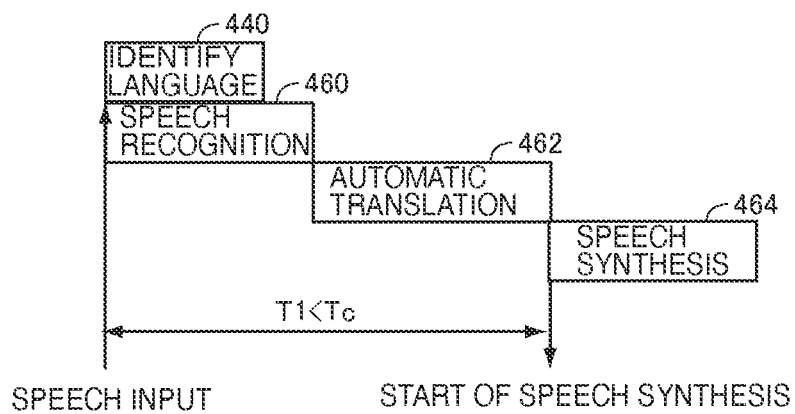
FIG. 12 is a schematic illustration showing time course of speech processing when a final result of speech processing can be obtained in a short period of time in accordance with the first embodiment of the present invention.
Figure 13:
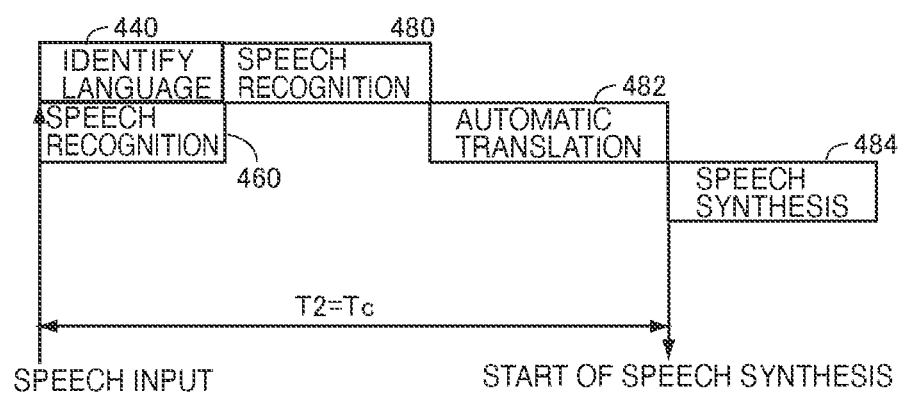
FIG. 13 is a schematic illustration showing time course of speech processing when it takes the longest time to obtain a final result of speech processing in accordance with the first embodiment of the present invention.

Referring to FIGS. 11 to 13, the effect of multi-lingual speech processing device 100 will be described.

FIG. 11 is a schematic illustration showing a time course of speech processing in accordance with a conventional method. When a speech is input, first, language identification 440 starts, and using its result, speech recognition 442 starts. When the results of the speech recognition 442 are output successively, automatic translation 444 is executed on speech recognition 442. Outputs of automatic translation 444 are subjected to speech synthesis 446.

As shown in FIG. 11, in the conventional method, the time period from the start of the language identification 440 until the start of speech synthesis 446 will be denoted by Tc, in comparison with the embodiment described above.

FIG. 12 is a schematic illustration showing a time course of speech processing when a final result of speech processing can be obtained in a short period of time in accordance with the first embodiment of the present invention. Referring to FIG. 12, in the embodiment above, the language identification 440 and the speech recognition 460 start simultaneously. Speech recognition 460 is speech recognition from the default language to the partner's language. When the result is output, the automatic translation process 462 starts. When the language as the result of identification by language identification 440 matches the default language, speech recognition 460 and automatic translation process 462 are continued without interruption, and speech synthesis 464 starts on the results of the automatic translation.

In the example shown in FIG. 12, the speech recognition 460 and the language identification 440 start simultaneously and, therefore, the time T1 until speech synthesis 464 starts is clearly shorter than the time Tc of FIG. 11. When we compare FIGS. 11 and 12, it can be seen that the time T1 is shorter than the time Tc by the time period necessary for language identification 440.

FIG. 13 is a schematic illustration showing a time course of the speech processing when it takes the longest time to obtain a final result of speech processing in accordance with the first embodiment of the present invention. In this example, the language identified by the language identification 440 is different from the default language. Here, as in the case shown in FIG. 12, speech recognition 460 and language identification 440 start simultaneously and after speech recognition, automatic speech translation would be executed. At the end of the language identification 440, however, speech recognition 460 is stopped, and speech recognition 480 of identified language is newly started as well as the automatic translation 482 of the result to the partner's language and speech synthesis 484 on the result of automatic translation. Since speech recognition 480 starts from the beginning of the input speech, the time T2 from the speech input until the start of speech synthesis 484 becomes the same as the time Tc shown in FIG. 11.

Specifically, according to the present embodiment, when the default language matches the identified language, the time necessary before the result of speech translation process is output is shorter than the conventional art. The time becomes shorter at least by the time necessary for the first language identification. Even when the default language does not match the identified language, the time necessary before the result of speech translation process is output is the same as the conventional art.

As a result, a speech processing device can be provided that can quickly provide the result of speech processing even when the language of speech given by the speech signal is unknown.

Further, the output from the language identifying neural network 132 is not directly used for language identification, but rather, the probabilities of a plurality of languages (in the embodiment, three) designated in advance are selected from a plurality of different languages (in the embodiment, eight), the probabilities are normalized, and the language having the highest probability is selected. By comparing the probability of the language with a threshold, whether the identification result should be accepted or discarded is determined. As a result, highly accurate language identification becomes possible without complicating the determination process by the language identifying neural network 132. Further, of a plurality of languages, some of the languages can be selected and designated beforehand as the object of processing. Therefore, even when the partner's language is unknown, a combination of languages that may include the object of language identification with high possibility can be designated by guessing where the speech partner comes from. This improves the possibility of starting smooth dialogue.

Further, in the embodiment above, after the language is identified, the new default language is set to the speech partner's language of speech processing and the next speech partner's language is set to the identified language. As a result, when two persons talk to each other, smooth speech translation from one language to another becomes possible. Though it is assumed in the present embodiment that two speakers utter alternately, the invention can be easily enhanced to cover one speaker or three speakers. The process for setting these may be readily implemented by a program performing a common dialogue process.

In the embodiment above (Method 1), three models (utterance lengths of 1.5 seconds, 2.0 seconds and 3.0 seconds) were used as language identifying models. The present invention, however, is not limited to such an embodiment. By way of example, four language identifying models may be used with object utterance lengths set to 1.0 second, 1.5 seconds, 2.0 seconds and 3.0 seconds (Method 2). Alternatively, it is also possible to use the same three models and to set utterance lengths to 1.0 second, 1.5 seconds and 2.0 seconds (Method 3). In this case, accuracy will be Method 1>Method 2>Method 3 and the latency will be Method 3<Method 2<Method 1.

Results of experiments show that the three methods above all attained the accuracy of 95% or higher with the threshold being 0.85. When Methods 2 and 3 were used, the latency was as short as 1.3 seconds in average.

Further, various combinations of identifying models are possible to meet the purposes. It is naturally possible to use only one identifying model.

In each of the methods described above, speech data of a prescribed length from the beginning of an utterance is used as the object of the language identifying model. The present invention, however, is not limited to such an embodiment. By way of example, speech data having the same utterance length (for example, 1.0 second or 1.5 seconds) and the beginning shifted by 0.5 seconds may be used as objects and language 1055 identification may be done successively. In this case, one same identifying model may be used. Here again, the utterance length or lengths to be the objects and the number of language identifying models may be selected as desired to meet the purposes.

Second Embodiment

<Configuration>

Multi-lingual speech processing device 100 in accordance with the first embodiment is realized by a single computer. It is naturally possible to use a plurality of computers to share various functions of multi-lingual speech processing device 100.

Figure 14:
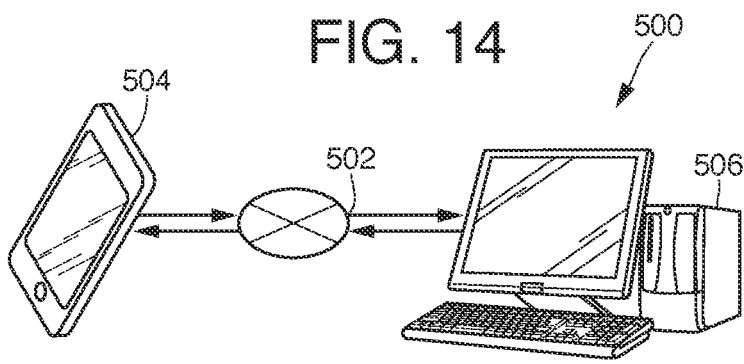
FIG. 14 is a schematic illustration showing an overall configuration of a speech dialogue system in accordance with a second embodiment of the present invention.

FIG. 14 is a schematic illustration showing an overall configuration of a speech dialogue system in accordance with a second embodiment of the present invention. As shown in FIG. 14, a speech translation system 500 in accordance with the second embodiment prepares a multi-lingual speech translation server (hereinafter simply referred to as a "server") 506 that has most of the functions of multi-lingual speech processing device 100 of the first embodiment, performs speech language identification, automatic translation and speech synthesis in response to a speech translation request applied from a device such as a smart-phone 504 through the Internet 502, and returns a speech signal from server 506 to smart-phone 504. In order to realize such a configuration, in the present embodiment, basic information (language used) of the user using smart-phone 504 stored in smart-phone 504 is used. Further, as described in the first embodiment, the user of smart-phone 504 is allowed to select three languages from eight object languages. Such information is necessary for the language identifying process on server 506 and, therefore, it is transmitted together with the speech data, to server 506.

Figure 15:
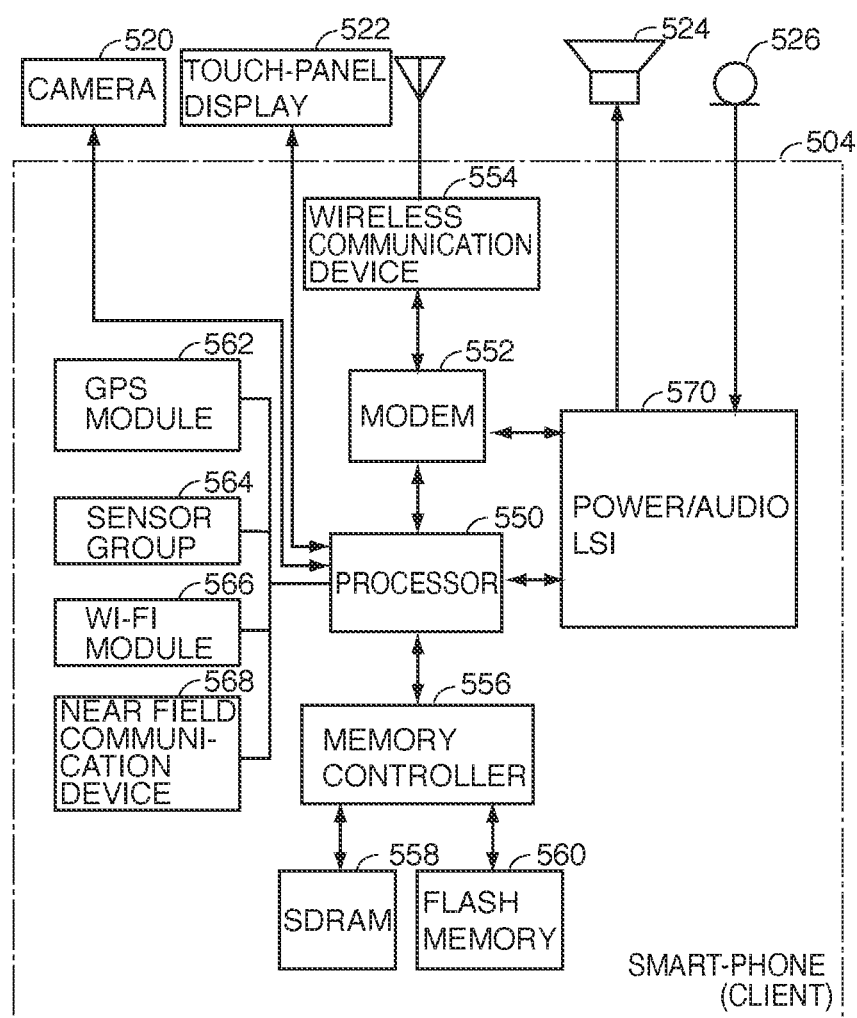
FIG. 15 is a block diagram schematically showing a hardware configuration of a smart-phone used as a terminal in the second embodiment.

FIG. 15 is a block diagram schematically showing a hardware configuration of a smart-phone used as a terminal in the second embodiment. Referring to FIG. 15, smart-phone 504 has a camera 520, a touch-panel display 522, a speaker 524 and a microphone 526. Smart-phone 504 further includes a processor 550, which is a computer for executing various processes, a memory controller 556 connected to processor 550, an SDRAM (Static Dynamic Access Memory) 558 and a flash memory 560 both connected to memory controller 556, a power/audio LSI 570 connected to processor 550, a modem 552 for wireless communication connected to processor 550 and to power/audio LSI 570, and a wireless communication device 554 having an antenna for wireless transmission/reception connected to modem 552.

Smart-phone 504 further includes a GPS (Global Positioning System) module 562 as a peripheral device of processor 550, a group of sensors 564 including an acceleration sensor, a temperature sensor and a moisture sensor, a Wi-Fi module 566 and a near field communication device 568.

The program executed by processor 550 is stored in flash memory 560 and loaded to SDRAM 558 at the time of execution. By executing the program, processor 550 controls various modules in smart-phone 504, so as to execute various operations including storage of set values, acquiring speech data of a speaker through microphone 526, transmission of speech data to server 506 and reception of speech translation results from server 506 through modem 552, wireless communication device 554 or GPS module 562, and playback of speech using speaker 524.

Figure 16:
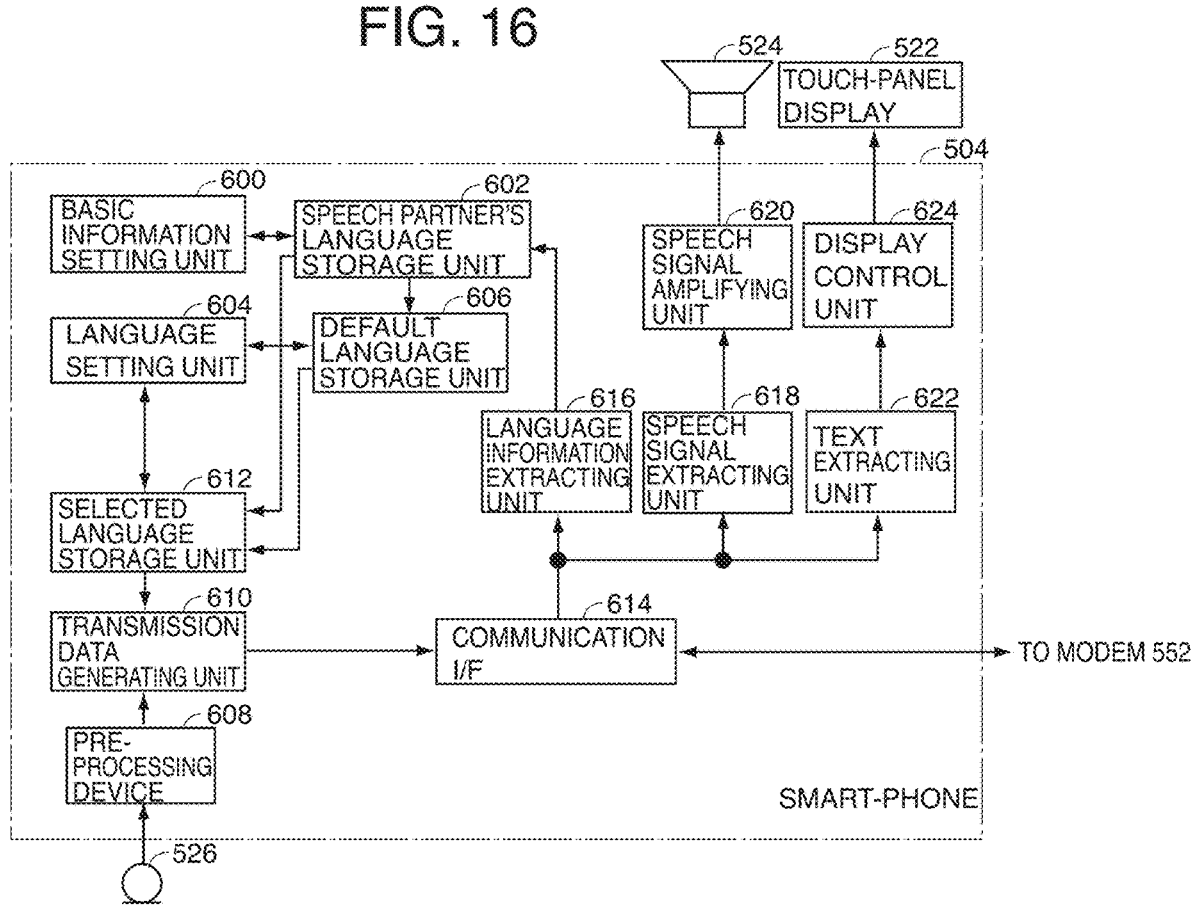
FIG. 16 is a block diagram showing a functional configuration of the smart-phone shown in FIG. 15.

FIG. 16 is a block diagram showing a functional configuration of the smart-phone shown in FIG. 15. Functions realized by the program executed by processor 550 are shown in the form of a block diagram.

Referring to FIG. 16, functionally, smart-phone 504 includes: a basic information setting unit 600 for setting basic information (at least including the language used by the user) of smart-phone 504; a speech partner's language storage unit 602 storing the language of speech partner for speech translation; a language setting unit 604 for setting which three languages are to be selected from eight different languages and which of the three languages is to be set as the default language; a default language storage unit 606 for storing the default language for the speech translation process; and a selected language storage unit 612 for storing information related to the language set by language setting unit 604. When the speech translation process is invoked, the user's language in basic information setting unit 600 is stored in speech partner's language storage unit 602, and the default language set by language setting unit 604 is stored in default language storage unit 606.

Smart-phone 504 further includes: a pre-processing device 608 for executing pre-processing of a speech signal, for example, executing the same process as executed by speech processing device 130 shown in FIG. 2 on a speech signal obtained from microphone 526 and outputting a speech data vector sequence; a transmission data generating unit 610 for generating transmission data requesting speech translation to server 506, from the selected language stored in selected language storage unit 612, the speech partner's language stored in speech partner language storage unit 602, the default language stored in default language storage unit 606 and the speech data vector sequence output from pre-processing device 608; and a communication I/F 614 for performing transmission of transmission data generated by transmission data generating unit 610 to server 506, and reception of processed data from server 506, through modem 552 and wireless communication device 554 or Wi-Fi module 566 shown in FIG. 15.

Smart-phone 504 further includes: a language information extracting unit 616 extracting information indicating the partner's language from the data received by communication I/F 614 from server 506; a speech signal extracting unit 618 for extracting speech-translated speech signal from the data received by communication I/F 614; a speech signal amplifying unit 620 for analog-converting and amplifying the speech signal and outputting speech-translated speech by driving speaker 524; a text extracting unit 622 for extracting speech-translated text from the data received by communication I/F 614 from server 506; and a display control unit 624 for displaying the text on touch-panel display 522.

Figure 17:
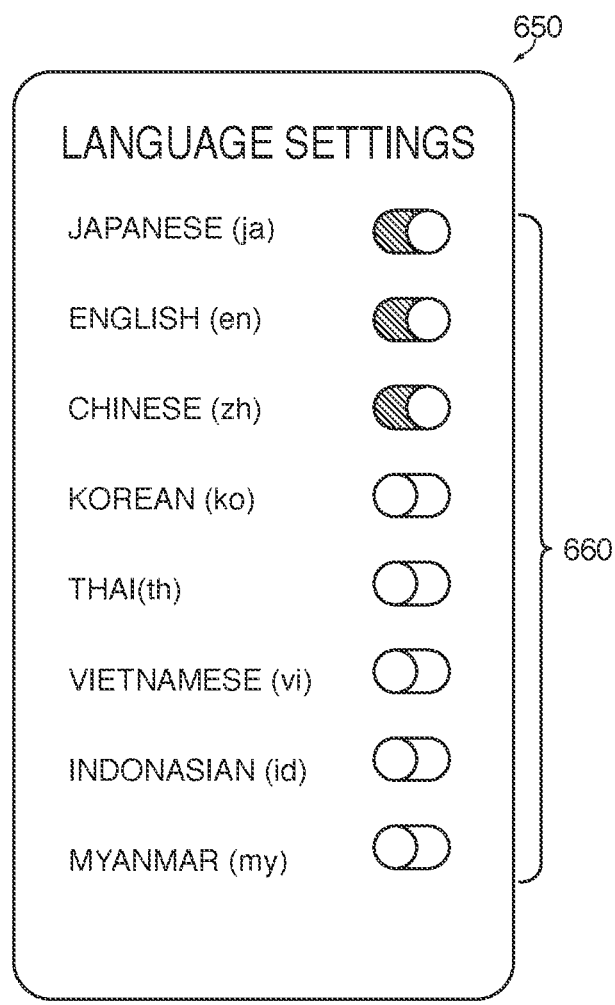
FIG. 17 is a schematic illustration showing a screen allowing language setting of the smart-phone shown in FIG. 15.

FIG. 17 is a schematic illustration showing a screen allowing language setting of the smart-phone shown in FIG. 15. Referring to FIG. 17, on a language setting image screen 650 displayed on touch-panel display 522, names of eight different languages 660 that can be the object of selection are displayed, each with a switch allowing selection. If the switch is moved to the right, the language is selected and if moved to the left, selection of the language is cancelled. In the example shown in FIG. 17, Japanese, English and Chinese are selected, and other languages are not selected. Images for the basic information setting image screen and the default language setting image screen can also be realized by similar interface.

Figure 18:
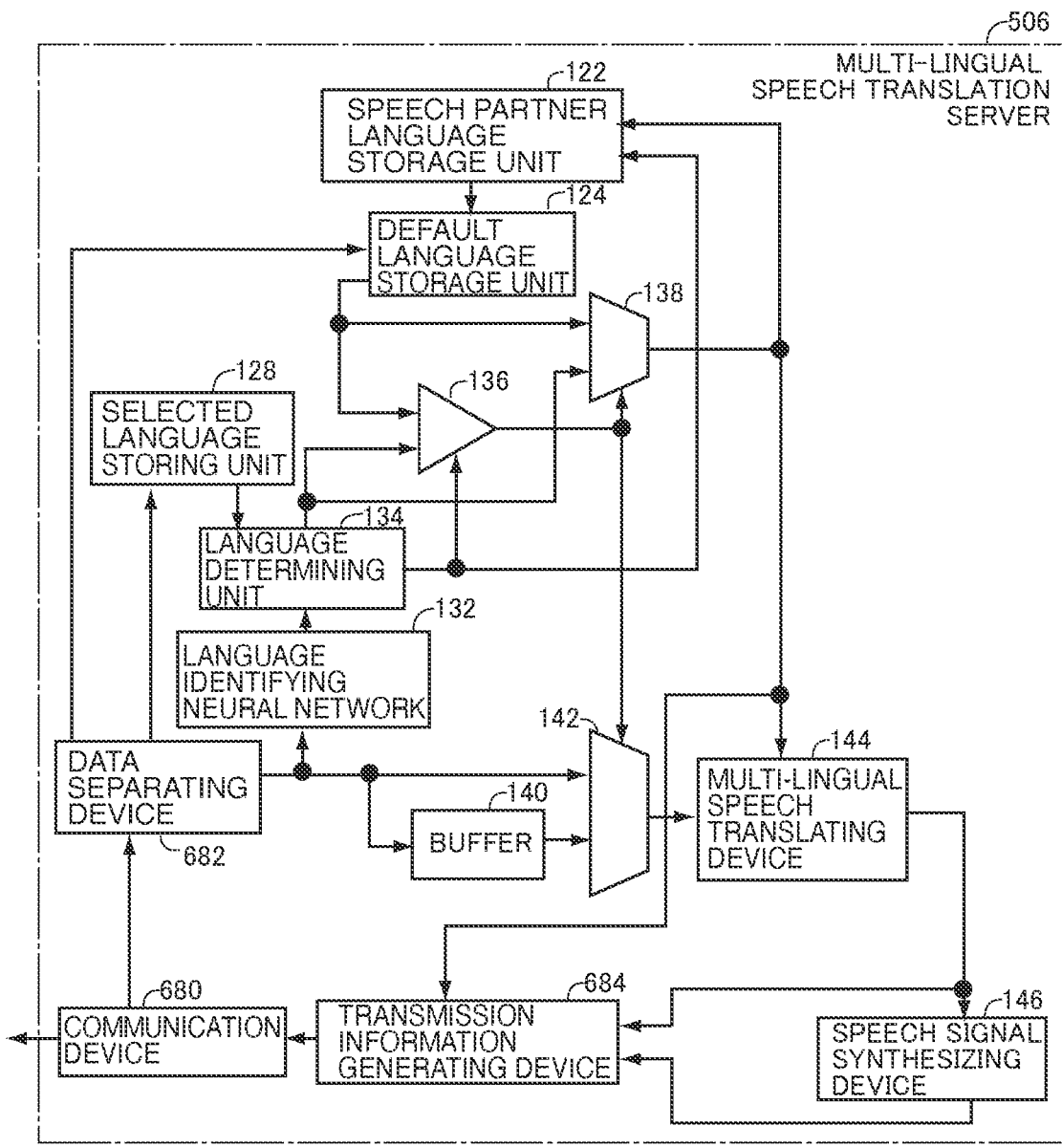
FIG. 18 is a functional block diagram of a multi-lingual speech translation system as the server side shown in FIG. 15.

FIG. 18 is a functional block diagram of server 506 shown in FIG. 15. Referring to FIG. 18, server 506 has a configuration similar to that of multi-lingual speech processing device 100 shown in FIG. 2, and includes: selected language storage unit 128, speech partner language storage unit 122, language setting unit 124, language identifying neural network 132, language determining unit 134, language selecting unit 138, buffer 140, speech data selecting unit 142, multi-lingual speech translating device 144 and speech signal synthesizing device 146, all similar to those shown in FIG. 2.

Multi-lingual speech translation server 506 further includes: a communication device 680 for communicating with a terminal device such as smart-phone 504; a data separating device 682 for separating information related to the selected language and information related to the default language from the data requesting speech translation received by communication device 680, and for storing the former information in selected language storage unit 128 and the latter in language setting unit 124, respectively; and a transmission information generating device 684 for generating transmission information to be transmitted to the terminal device such as smart-phone 504 that has sent the speech translation request, from the speech-translated text output from multi-lingual speech translating device 144, speech-translated synthesized speech signal output from speech signal synthesizing device 146 and information related to the identified language identified by language identifying neural network 132 and language determining unit 134 output from language selecting unit 138, and applying the transmission information to communication device 680.

While a program structure that causes smart-phone 504 shown in FIG. 15 to function as a client of the speech translation system is not described here, in summary, the following processes will be executed.

By a program for setting basic information, basic information of smart-phone 504 is registered and stored in a storage device such as a SDRAM 558. This process is unrelated to the speech translation system and it is a basic process initially done by the user upon purchase of the smart-phone 504. The basic information includes information related to the language used by the user.

By a program for setting a language (part of a client program of the present system), selection of three languages from eight different languages as the objects of processing is received and stored in a storage device such as a SDRAM 558. At the same time, an input designating one of the selected three languages as a default language is received, and the default language is stored in the storage device.

When the program for speech translation is invoked, the language information stored in selected language storage unit 612, the default language stored in default language storage unit 606, the speech partner's language stored in speech partner's language storage unit 602 are read and put together with the input speech, to generate transmission data requesting speech translation, which data is transmitted to server 506.

Wait for the data transmitted from server 506.

When data is received from server 506, a speech signal is extracted and reproduced. Further, speech-translated text is extracted and reproduced. Further, information related to the identified speech included in the data is extracted and stored as the speech partner's language, in the storage device.

Thereafter, the above-described processes are executed every time a speech is input.

Figure 19:
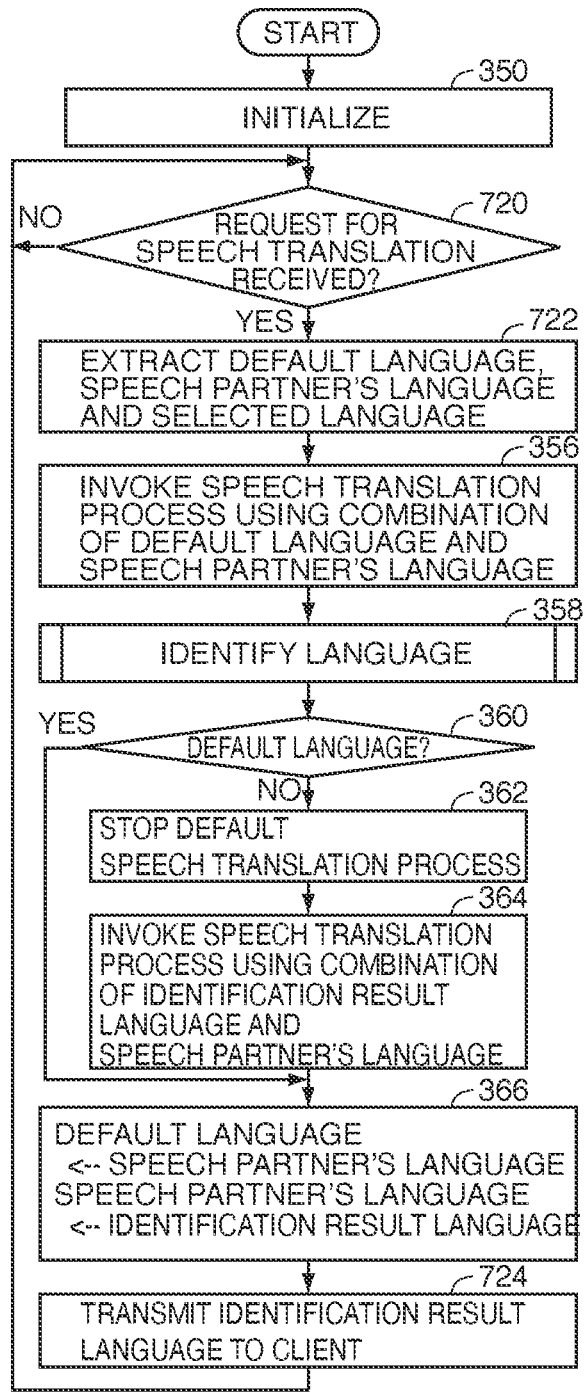
FIG. 19 is a flowchart showing a control structure of a computer program causing a computer to function as the multi-lingual speech translation system shown in FIG. 18.

FIG. 19 is a flowchart showing a control structure of a computer program causing a computer to function as the multi-lingual speech translation system shown in FIG. 18.

The flowchart shown in FIG. 19 has a structure very similar to the one shown in FIG. 8. The differences are as follows: in place of steps 352 and 354 of FIG. 8, it includes a step 720 of waiting until a speech translation request is received from a client such as smart-phone 504, and a step 722, responsive to reception of a speech translation request, of extracting the default language, the speech partner's language and the information related to the selected language included in the request, and storing these in respective storage devices; and that following the step 366 of FIG. 8, it includes a step 724 of transmitting the identified language to the client and returning the control to step 720.

<Operation>

The operation of smart-phone 504 can be clearly understood from the control structure of the program described above.

On the other hand, the operation of server 506 may be clear when we compare FIGS. 8 and 19. It is noted that in the present embodiment, it is necessary that the language identified by server 506 is transmitted to smart-phone 504, and that while the result of processing is output using the output built in the device shown in FIG. 8, the result must be transmitted to the client such as smart-phone 504 from server 506.

Except for these points, the operation of server 506 is the same as that of multi-lingual speech processing device 100 in accordance with the first embodiment. Therefore, in the second embodiment, as in the first embodiment, the result of speech translation process can be obtained in a shorter time than the conventional art when the default language matches the language of the identification result. Even when it does not match, the time until the result is obtained is the same as in the conventional art.

The mechanism for language identification is the same as in the first embodiment, and the same effects can be attained.

Further, setting of language is done in the similar manner as in the first embodiment. Therefore, as in the first embodiment, high accuracy of language identification can be attained even when language identifying neural network 132 is simplified.

In the embodiment above, there are eight languages as the objects of selection and three languages are selected therefrom. Naturally, the present invention is not limited to such numbers. The same effects as described above can be attained provided that the number of languages as the objects of selection is larger than the number of languages to be selected, and that a plurality of languages is selected.

Further, in the embodiment above, only one default language is set. If computational resource allows, however, two or more default languages may be set. Specifically, when a speech is received and language identification starts, speech processing of the speech with two or more default languages starts simultaneously. When the result of language identification is obtained, processing of the identified language only is continued and processing in other language or languages is stopped. As compared with the technique disclosed in Patent Literature 1 in which speech recognition is done in all languages and one of the results of speech recognition is selected based on the final scores, necessary computational resource can be reduced. This approach does not require much change in the configuration of multi-lingual speech processing device 100 and the like. What is necessary is simply to store a plurality of default languages, to enable selection signals to be applied to devices of respective languages such as speech recognition devices 220, . . . , 234 (FIG. 4) included in multi-lingual speech translating device 144 to designate two or more of these devices, and to enable data distributing unit 258 to supply speech data to these two or more devices.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST

- 1280 100 multi-lingual speech processing device
- 120, 600 basic information setting unit
- 122, 602 speech partner language storage unit
- 124, 604 language setting unit
- 126, 606 default language storage unit
- 1285 128, 612 selected language storing unit
- 130 speech processing device
- 132 language identifying neural network
- 134 language determining unit
- 142 speech data selecting unit
- 144 multi-lingual speech translating device
- 146 speech signal synthesizing device
- 170 group of convolution layers
- 172 fully connected layer
- 202 probability normalizing unit
- 204 maximum probability selecting unit
- 206 threshold comparing unit
- 220, 222, 224, 226, 228, 230, 232, 234 speech recognition device
- 240, 242, 244, 246, 248, 250, 252, 254 multi-lingual translation device
- 262, 264, 266, 268, 270, 272, 274 automatic translation engine
- 1300 440 language identification
- 442, 460, 480 speech recognition
- 444, 462, 482 automatic translation
- 446, 464, 484 speech synthesis
- 500 speech translation system
- 506 multi-lingual speech translation server.

The invention claimed is:

1. A language identifying device for identifying a language represented by an input speech signal as one of a first plurality of languages, comprising:
    a neural network responsive to an input of a speech signal, for outputting, for each of said first plurality of languages at the same time, a score indicating that a speech represented by the speech signal is the speech in that language;
    a processor configured to select, from scores output from said neural network, scores of a second plurality of languages smaller than said first plurality of languages, designated beforehand from the first plurality of languages;
    the processor configured to normalize each of the scores selected on the basis of a sum of scores of the second plurality of languages;
    the processor configured to determine whether a maximum value of the normalized scores is equal to or larger than a threshold value; and
    the processor configured to, responsive to the determination, selectively perform either one of a process of deciding the language corresponding to the maximum value of said score as the language of the speech represented by said speech signal and a process of discarding the output of said score selecting.

2. The language identifying device according to claim 1, wherein said neural network is trained in advance to output, in response to a time series of acoustic features calculated from said speech signal, scores of languages of the speech represented by the speech signal at the same time.

3. The language identifying device according to claim 2, wherein
    each of said scores output from said neural network is normalized with respect to the sum of said scores.

4. A speech processing device, comprising:
    a language name storage for storing language name of a default language to be an object of speech processing;
    a processor
    capable of performing at least speech recognition of each of a plurality of languages, for receiving designation of a language name and for processing a given speech signal as a speech of the designated language;
    the processor configured to, responsive to an input of said speech signal, identify a language represented by the speech signal as one of said plurality of languages utilizing a neural network responsive to the input of the speech signal, for outputting, for each of said first plurality of languages at the same time, a score indicating that a speech represented by the speech signal is the speech in that language;
    the processor configured to, responsive to the input of said speech signal, designate said default language stored in said language name storage, and activate first processing of said speech signal;
    the processor configured to determine whether the language identified matches said default language or not; and
    the processor configured to, when the language identified does not match the default language, end the first processing of said speech signal, and activate, from a prescribed position of said speech signal, second processing of said speech signal by designating the language identified.

5. The speech processing device according to claim 4, further comprising:
    the processor configured to determine, based on the determination and on said default language stored in said language name storage, which of said plurality of languages is to be determined to be the language name of the default language stored in said language name storage, and having it stored in said language name storage.

6. A method of identifying a language of an input speech signal among a first plurality of languages, comprising the steps of:
    a first step of trying, based on said speech signal from a start of said speech signal until a lapse of a first time period, identification of the language of said speech signal among said first plurality of languages utilizing a neural network responsive to an input of the speech signal, for outputting, for each of said first plurality of languages at the same time, a score indicating that a speech represented by the speech signal is the speech in that language;
    a step of outputting, in response to identification of language of the speech signal at said first step, information indicating the language;
    a second step of trying, in response to failure of language identification of said speech signal at said first step, based on said speech signal from the start of said speech signal until a lapse of a second time period longer than said first time period, identification of the language of said speech signal among said first plurality of languages;

a step of outputting, in response to identification of language of the speech signal at said second step, information indicating the language; and an additional identification step of executing, in response to failure of language identification of said speech signal at said second step, a prescribed additional process for identifying the language of said speech signal.

7. The method according to claim 6, wherein said additional identification step includes a third step of trying, in response to failure of language identification of said speech signal at said second step, based on said speech signal from the start of said speech signal until a lapse of a third time period longer than said second time period, identification of the language of said speech signal among said first plurality of languages.

8. The method according to claim 7, wherein said first step includes:

a score calculating step of repeatedly outputting from the start of said speech signal until a lapse of said first time period, based on the speech signal from the start of the speech signal, for each of said first plurality of languages, a score indicating possibility that the speech signal represents the language; and a step of selectively executing, in response to said scores calculated for each of said first plurality of languages at said score calculating step, based on the result of comparison between each of said scores and a prescribed threshold value, a process of identifying the language of said speech signal and a process of discarding said scores; wherein said threshold value is determined beforehand to realize a prescribed accuracy or latency of language identification by said method.

9. The method according to claim 6, wherein said first step includes:

a score calculating step of repeatedly outputting from the start of said speech signal until a lapse of said first time period, based on the speech signal from the start of the speech signal, for each of said first plurality of languages at the same time, a score indicating possibility that the speech signal represents the language utilizing the neural network; and a step of selectively executing, in response to said scores calculated for each of said first plurality of languages at said score calculating step, based on the result of comparison between each of said scores and a prescribed threshold value, a process of identifying the language of said speech signal and a process of discarding said scores; wherein said threshold value is determined beforehand to realize a prescribed accuracy or latency of language identification by said method.

10. The method according to claim 6, wherein said first step includes:

a first score calculating step of repeatedly outputting from the start of said speech signal until a lapse of said first time period, based on the speech signal from the start of the speech signal, for each of said first plurality of languages at the same time, a score indicating possibility that the speech signal represents the language utilizing the neural network;

a step of selecting scores of a predetermined second plurality of languages from scores of said first plurality of languages, said second plurality being smaller than said first plurality; and a step of identifying the language of said speech signal on the basis of the scores selected at the step of selecting.

\* \* \* \* \*